US009069745B2

(12) United States Patent
Jacobsen et al.

(10) Patent No.: US 9,069,745 B2
(45) Date of Patent: Jun. 30, 2015

(54) ELECTRONIC FORM AUTOMATION

(75) Inventors: Eliot W. Jacobsen, Orem, UT (US); Hugo Olliphant, San Francisco, CA (US)

(73) Assignee: eBay, Inc., San Jose, CA (US)

( * ) Notice: Subject to any disclaimer, the term of this patent is extended or adjusted under 35 U.S.C. 154(b) by 1390 days.

(21) Appl. No.: 11/656,635

(22) Filed: Jan. 23, 2007

(65) Prior Publication Data

US 2008/0172598 A1    Jul. 17, 2008

Related U.S. Application Data

(60) Provisional application No. 60/885,180, filed on Jan. 16, 2007.

(51) Int. Cl.
*G06F 17/00*    (2006.01)
*G06F 17/24*    (2006.01)
*G06Q 30/06*    (2012.01)

(52) U.S. Cl.
CPC .......... *G06F 17/243* (2013.01); *G06Q 30/0603* (2013.01)

(58) Field of Classification Search
USPC .......... 715/221–226, 243, 764, 781; 707/1, 9, 707/10, 100; 726/26–30
See application file for complete search history.

(56) References Cited

U.S. PATENT DOCUMENTS

| | | | |
|---|---|---|---|
| 5,784,562 A * | 7/1998 | Diener | 709/217 |
| 6,088,700 A * | 7/2000 | Larsen et al. | 707/10 |
| 6,456,740 B1 * | 9/2002 | Carini et al. | 382/187 |
| 6,490,601 B1 | 12/2002 | Markus et al. | |
| 6,499,042 B1 * | 12/2002 | Markus | 715/217 |
| 6,662,340 B2 * | 12/2003 | Rawat et al. | 715/236 |
| 6,851,087 B1 * | 2/2005 | Sibert | 715/236 |
| 7,062,258 B1 * | 6/2006 | Sini et al. | 455/414.1 |
| 7,072,059 B2 * | 7/2006 | Van Der Linden et al. | 358/1.15 |
| 7,171,615 B2 * | 1/2007 | Jensen et al. | 715/222 |
| 7,185,273 B2 * | 2/2007 | Thomason | 715/225 |

(Continued)

FOREIGN PATENT DOCUMENTS

| | | |
|---|---|---|
| WO | WO-0145022 A2 | 6/2001 |
| WO | WO-0231675 A1 | 4/2002 |

(Continued)

OTHER PUBLICATIONS

"Form Filler Programs: Leave the Paperwork to Your Software", *Productivity*, 6(12), http://www.smartcomputing.com/editorial/article.asp?article=articles/archive/l0612/15112/15112.asp&guid=, (Dec. 2000).

(Continued)

*Primary Examiner* — Laurie Ries
(74) *Attorney, Agent, or Firm* — Schwegman Lundberg & Woessner, P.A.

(57) ABSTRACT

Some embodiments may provide a method comprising receiving, from a remote machine, entity-identifying data and form identifying data, the form identifying data to identify a sequence of one or more electronic forms, the sequence including a target electronic form having a form element, determining an entity identifier, based on the entity-identifying data, accessing, from a data store, an entity attribute value based on the entity identifier, and transmitting, to the remote machine, form-filling instructions operable to cause a machine to automatically associate an entity attribute value with the form element.

42 Claims, 22 Drawing Sheets

(56) References Cited

U.S. PATENT DOCUMENTS

| | | | | |
|---|---|---|---|---|
| 7,203,699 | B2* | 4/2007 | Bellamy | 707/102 |
| 7,206,998 | B2* | 4/2007 | Pennell et al. | 715/224 |
| 7,216,292 | B1* | 5/2007 | Snapper et al. | 715/236 |
| 7,296,221 | B1* | 11/2007 | Treibach-Heck et al. | 715/224 |
| 7,660,779 | B2* | 2/2010 | Goodman et al. | 706/48 |
| 2002/0013788 | A1* | 1/2002 | Pennell et al. | 707/507 |
| 2002/0023108 | A1* | 2/2002 | Daswani et al. | 707/507 |
| 2004/0019594 | A1 | 1/2004 | Segapeli et al. | |
| 2004/0186775 | A1 | 9/2004 | Margiloff et al. | |
| 2004/0205533 | A1 | 10/2004 | Lopata et al. | |
| 2005/0224674 | A1 | 10/2005 | Park | |
| 2005/0257134 | A1* | 11/2005 | Goodman et al. | 715/507 |
| 2006/0224674 | A1 | 10/2006 | Buchheit et al. | |
| 2006/0224951 | A1 | 10/2006 | Burke et al. | |
| 2007/0074101 | A1* | 3/2007 | Uthe | 715/507 |
| 2007/0250201 | A1* | 10/2007 | Elhanan et al. | 700/121 |

FOREIGN PATENT DOCUMENTS

| | | |
|---|---|---|
| WO | WO-2006004697 A2 | 1/2006 |
| WO | WO-2008088799 A2 | 7/2008 |
| WO | WO-2008088799 A3 | 7/2008 |

OTHER PUBLICATIONS

"International Application Serial No. PCT/US2008/000512, Search Report mailed Nov. 19, 2008", 4 pgs.
"International Application No. PCT/US2008/000512, Written Opinion mailed Nov. 19, 2008", 9 pgs.
"Panicware—Roboform", http://www.panicware.com/product_roboform.html, (Copyright 2000-2007).
"Roboform", http://www.roboform,com/, (May 14, 2007).
"Roboform—FAQ", http://www.roboform.com/faq.html, (Copyright 2000-2007).
"Roboform Features—Quick Summary", http://www.roboform.com/features.html, (May 14, 2007).
Butler, Peter, "Fill Web forms quickly with Sxipper", http://www.webware.com/8301-1_109-9667276-2.html, (Dec. 8, 2006).
European Application Serial No. 08713145.4, Extended European Search Report mailed Feb. 2, 2010, 6 pgs.
"European Application Serial No. 08713145.4 , Summons to attend Oral Proceeding mailed Jul. 8, 2011", 6 pgs.
"European Application Serial No. 08713145.4, Response filed Apr. 11, 2012", 8 pgs.
"European Application Serial No. 08713145.4, Written Decision to Refuse mailed Nov. 21, 2011", 23 pgs.
"European Application Serial No. 12152183.5, Extended Search Report mailed Jun. 12, 2012", 6 pgs.
"European Application Serial No. 08713145.4, Examination Notification Art. 94(3) mailed Oct. 26, 2010", 5 pgs.
"International Application Serial No. PCT/US2008/000512, International Preliminary Report on Patentability mailed Jul. 30, 2009", 12 pgs.
"European Application Serial No. 12152183.5, Examination Notification Atr. 94(3) mailed Mar. 4, 2013", 6 pgs.
"European Application Serial No. 12152183.5, Response filed Jun. 25, 2013 to Examination Notification Art. 94(3) mailed Mar. 4, 2013", 5 pgs.
"European Application Serial No. 12152183.5, Summons to Attend Oral Proceedings mailed May 13, 2014", 7 pgs.

* cited by examiner

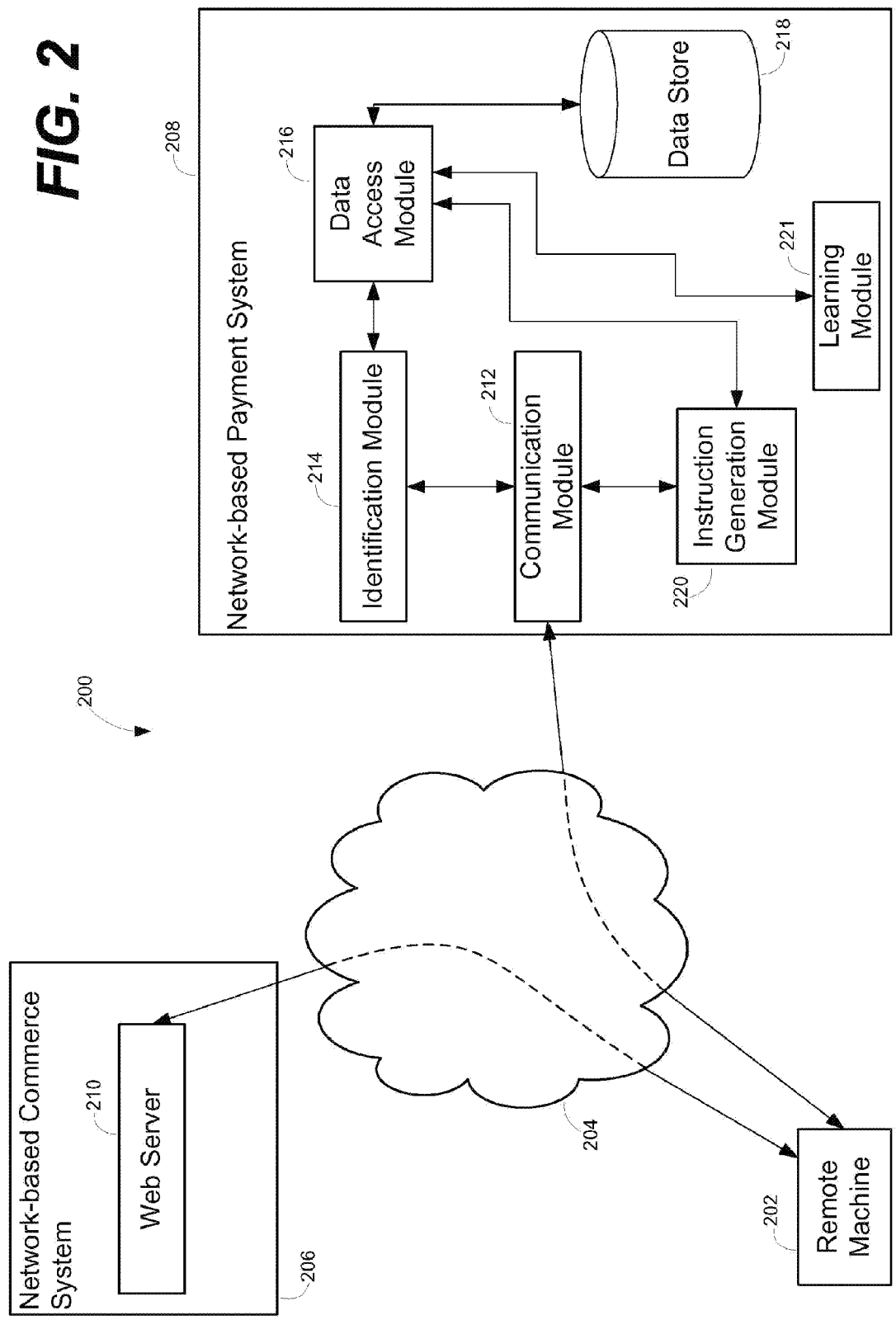

```html
<html>
<head>
<title>Check Out</title>
</head>
<body>
<form action=http://www.some_merchant.com/checkout3.htm method=get>
<table align="left" border="0" cellpadding="0" cellspacing="0" width=300>
<tr>
 <td>Credit Card Number:</td>
 <td><input type="text" name="CC_NUM" value=""></td></tr>
<tr>
 <td>First Name</span></td>
 <td><input type="text" name="FIRST_NAME" value=""></td></tr>
<tr>
 <td colspan=3 align=right>
  <input type="submit" name="submit.x" value="Place Order"></td></tr></table>
</form>
</body>
</html>
```

ENTITY ATTRIBUTE TABLE

| Entity Identifier | Attribute Identifier | Attribute Value |
|---|---|---|
| E23653 | FIRST_NAME | Darren |
| E23653 | LAST_NAME | Carbondiox |
| E23653 | ADDRESS | 123 Chicken Street |
| E23653 | CITY | Denver |
| E23653 | STATE | WY |
| E23653 | ZIP | 20199 |
| E23653 | CREDITCARD | 5552 1235 5678 9707 |
| E23653 | BILL_ADDR_SAME | True |
| E23653 | MZ_MEMBER_NO | 155-78657 |
| E23653 | FAVORITE_COLOR | Red |
| G10085 | FIRST_NAME | Anna |
| G10085 | LAST_NAME | Caro |
| G10085 | ADDRESS | 775 Creature Ave. #105 |
| G10085 | CITY | New York |
| G10085 | STATE | VA |
| G10085 | ZIP | 15651 |
| G10085 | CREDITCARD | 5552 1235 5678 9101 |
| G10085 | BILL_ADDR_SAME | False |
| G10085 | BILL_ADDRESS | 305 Ocean Ave. |
| G10085 | FAVORITE_COLOR | Raw Umber |

| ENTITIES TABLE | | | |
|---|---|---|---|
| Entity Identifer | Name | Password | E-mail |
| E23653 | Darren Carbondiox | silver2345 | dco2@singmail.gov |
| G10085 | Anna Caro | 23keuf785 | anna_c@s_burger.co.uk |

| FORM INFORMATION TABLE | | | |
|---|---|---|---|
| NBCS Identifer | Form Identifier | Form Element Identifier | Entity Attribute Identifier |
| 123-AEH | www.some_merchant.com/checkout.htm | FN | FIRST_NAME |
| 123-AEH | www.some_merchant.com/checkout.htm | LN | LAST_NAME |
| 123-AEH | www.some_merchant.com/checkout.htm | ADR | ADDRESS |
| 123-AEH | www.some_merchant.com/checkout.htm | C | CITY |
| 123-AEH | www.some_merchant.com/checkout.htm | ST | STATE |
| 123-AEH | www.some_merchant.com/checkout.htm | PC | ZIP |
| 123-AEH | www.some_merchant.com/checkout2.htm | CC_NUM | CREDITCARD |
| 123-AEH | www.some_merchant.com/checkout2.htm | B_A_SAME_BOX | BILL_ADDR_SAME |
| 672-RSW | www.mz_merchant.com/checkout_scr.htm | FIRST_N | FIRST_NAME |
| 672-RSW | www.mz_merchant.com/checkout_scr.htm | LAST | LAST_NAME |
| 672-RSW | www.mz_merchant.com/checkout_scr.htm | MN | MZ_MEMBER_NO |

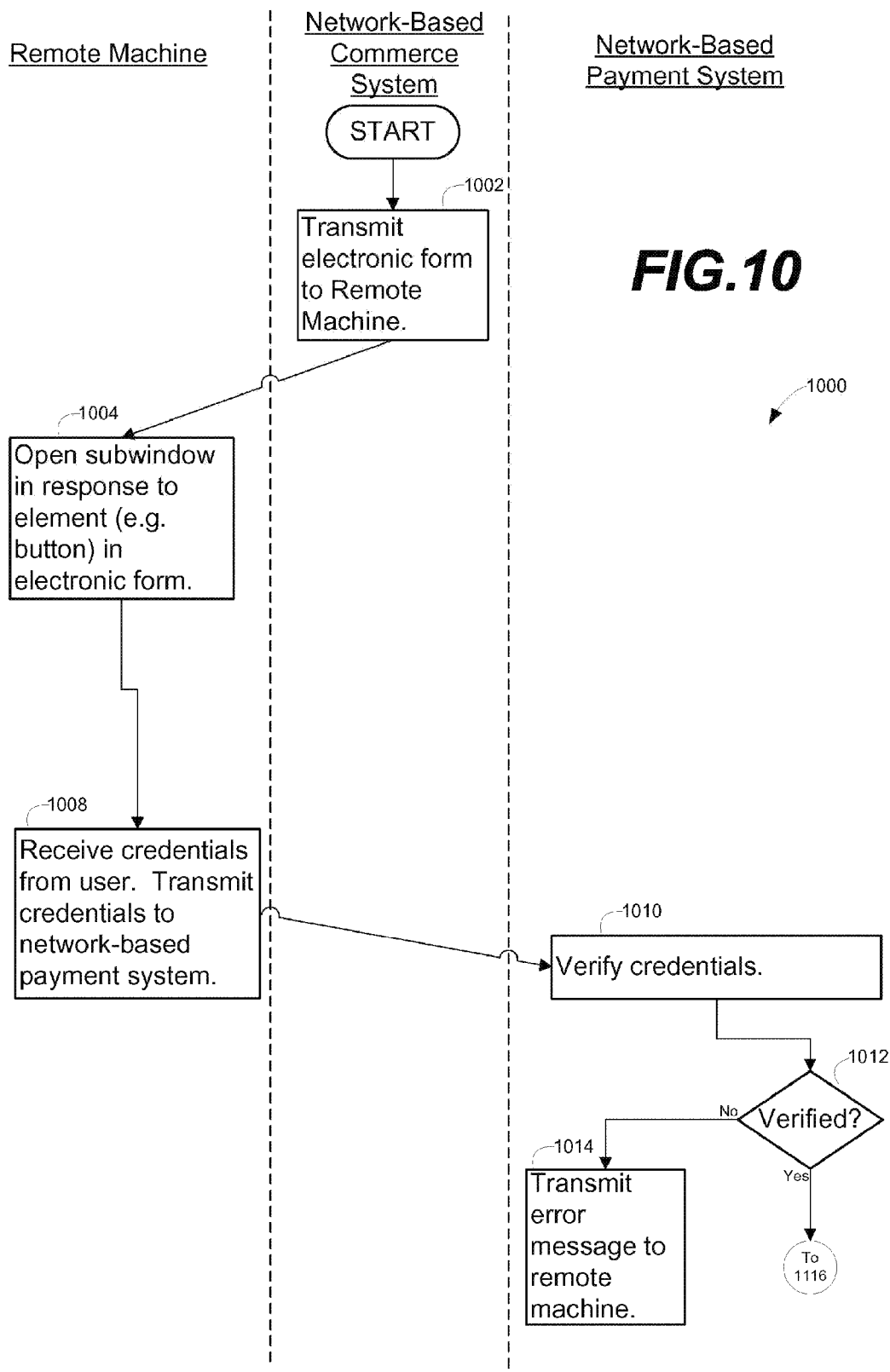

FIG.11

| Remote machine | Network-Based Commerce System | Network-Based Payment System |
|---|---|---|

1116: Transmit GUID or other identifier to remote machine.

1118: Redirect subwinow to retrieve script-referencing HTML.

1120: Render script-referencing HTML.

1122: Request script, transmitting GUID

1124: Generate script.

1126: Transmit script to Remote Machine.

1128: Execute script. Excution of script fills electronic form in main window and submission of form entries to network-based commerce system.

1130: Receive form entries and process checkout.

END

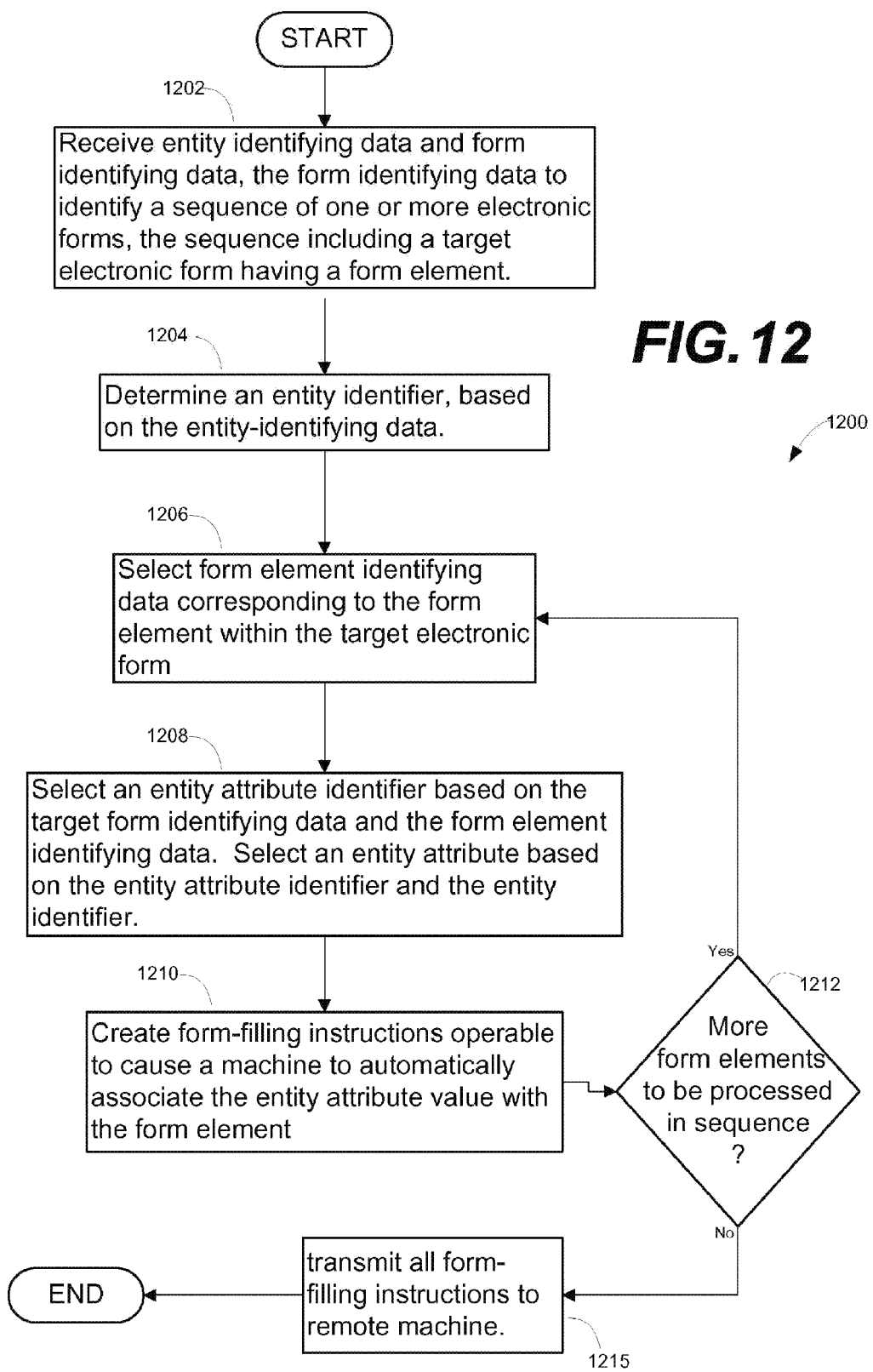

Check Out

Address https://www.some_merchant.com/checkout.htm

| SUBTOTAL | $594.70 |
|---|---|
| TAX | $38.53 |
| SHIPPING & HANDLING | $75.00 |
| TOTAL | $708.23 |

Name

Address

City/State/ZIP

Credit Card Number

Billing Address Same? ☐

Place Order

Auto-Checkout

Automated Checkout

Address https://www.xyz_pay.com/cred.htm

Email Address dco2@singmail.com

Password silver2345

Check Out

Address: https://www.some_merchant.com/checkout.htm

| | |
|---|---|
| SUBTOTAL | $594.19 |
| TAX | $38.53 |
| SHIPPING & HANDLING | $15.00 |
| TOTAL | $647.63 |

Name: Darren  Carbondiox

Address: 1923 Chicken Street

City/State/ZIP: Denver  WY  201999

Credit Card Number: 5552 19234 56198 919019

Billing Address Same? ✓

[Place Order]

[Watch Checkout]

1802
1806

Checkout Record

Address: https://www.xyz_pay.com/cred.htm

Email Address: dco2@singmail.com

Password: silver2345

Receive data and store in database. Use entity attribute value(s) to create association between form element identifying data and entity attribute identifiers.

ELECTRONIC FORM AUTOMATION

RELATED APPLICATIONS

This application claims priority to U.S. Provisional Application Ser. No. 60/885,180, entitled "Electronic Form Automation" and filed on Jan. 16, 2007, the disclosure of which is hereby incorporated by reference herein.

TECHNICAL FIELD

The present application relates generally to the technical field of methods and systems to perform on-line ordering and payment processing.

BACKGROUND

In recent years, the Internet has made possible online commerce services. Typically, a customer visits the web site of a merchant that has set up a network-based commerce system. Once the customer has selected some items to buy, the customer follows hyperlinks to a section of the web site where an order is placed, and a method of payment is entered, for the items. Typically, this process will require entering data in one or more pages. For example, a first web page may include an electronic form where the customer enters his/her name, address, phone number, etc. Having entered these details, the customer presses a "submit" button and is directed to a next page to select a shipping method. Next, the customer may be directed to a page in which billing information and a billing address may be entered. This page may include an electronic form for entering credit card number, expiration date, and other billing information. Finally, the user is presented with a button which, when clicked upon, commits the transaction and sends the information to the merchant for billing and shipping.

Often, a customer will be in the habit of repeatedly purchasing items from a particular merchant or from several merchants. In this situation, the repeated entry of billing addresses, payment instrument information, and the like may be experienced by the customer as tedious.

Since the customer's shipping addresses, billing information, etc. typically do not change much over time, some network-based commerce systems offer the option to create an account for a customer for storing these details, so that when a customer returns to make an additional purchase, the customer need only enter, for example, an email address and password before clicking the transaction commit button to purchase an item.

This approach is limited, however, in that the customer must set up such an account for each network-based commerce system through which the customer purchases goods or services, which with the rapid growth of a diversity of electronic commerce sites, may require setting up such accounts with a great many network-based commerce systems. In addition, some customers may hesitate to store their credit card numbers or other sensitive value-transfer facilitating information in numerous network-based commerce systems, out of fear of fraudulent or erroneous use by network-based commerce system personnel. Finally, if a customer's details change (shipping address changes (for example, new shipping address due to a move to a new residence, reissued credit card with a new number, etc.), the customer will need to remember all their accounts with various web-based commerce systems, log into them, and update his/her details. If the customer is in the habit of utilizing a large number of network-based commerce systems, this wholesale updating may be a error-prone chore.

BRIEF DESCRIPTION OF THE DRAWINGS

Some embodiments are illustrated by way of example and not limitation in the figures of the accompanying drawings in which:

FIG. 2 is a block diagram of a system that may be used to carry out electronic form automation, according to an example embodiment.

FIG. 3 illustrates an example of an electronic form, according to an example embodiment.

FIG. 5 illustrates an example of an entity attribute table, according to an example embodiment.

FIG. 6 illustrates an entities table and a form information table, according to example embodiments.

FIG. 10 and FIG. 11 include a flowchart of a process or carrying out automatic filling of electronic forms and form sequences, according to an example embodiment.

FIG. 12 is a flowchart of a process for generating and transmitting form filling instructions to a remote machine, according to an example embodiment.

FIG. 13 and FIG. 14 illustrate a user interface for electronic form automation, according to an example embodiment.

FIG. 18 and FIG. 19 illustrate graphical user interfaces that may be used in learning entity attribute values in the context of electronic form automation, according to an example embodiment.

DETAILED DESCRIPTION

Figure 1:
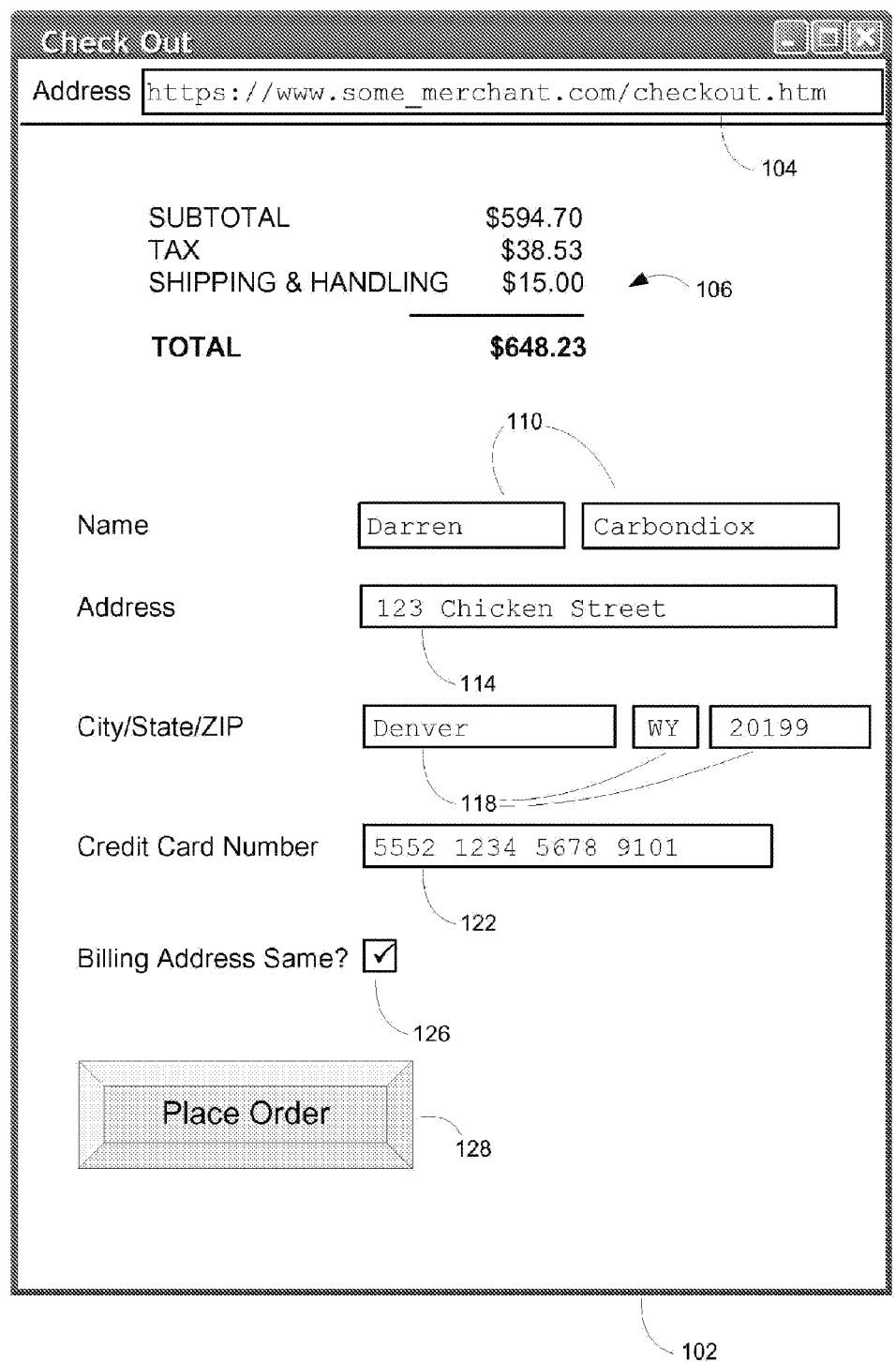
FIG. 1 illustrates a checkout web page or other electronic form as it may be presented within a graphical user interface on a remote machine, according to an example embodiment.

Example methods and systems to facilitate electronic form automation are described. In the following description, for purposes of explanation, numerous specific details are set forth in order to provide a thorough understanding of example embodiments. It will be evident, however, to one skilled in the art that the present invention may be practiced in other embodiments without these specific details.

Introduction

This specification includes descriptions of various example embodiments of systems and methods for electronic form automation. In the course of electronic commerce or other activities, it may be necessary for users to fill out forms using various user interface techniques. These forms may be termed "electronic forms" in analogy to paper forms in that they may include various form elements intended to permit a user to enter data into their graphical user interface (GUI) representation. These electronic forms may be presented or transmitted from web servers or other sources in a variety of formats including HyperText Markup Language (HTML) or Extensible Markup Language (XML), or an electronic document in another markup language. Electronic forms may in some embodiments may include one or more form elements. These form elements or descriptors (which may be rendered on a Graphical User Interface (GUI) or other user interface display as text entry boxes, check box, radio button, drop-down menus, selectable lists, and text entry fields, and the like). Upon receiving an electronic form from a server, a machine remote from the server may display the form within a web browser or other user interface application, receive user input corresponding to the various form elements, and transmit the user input and associations between the user input and the form elements to the server or another location or machine.

In the field of electronic commerce, electronic forms may be used. For example, a customer of a network-based commerce system (such as for example an online merchant, a electronic commerce site, an online bank, an online brokerage, an online auction system, or the like), may, after browsing through web pages or other electronic documents presenting descriptions of goods or services for sale may select one or more of these goods or services for purchase. The customer's desire to complete the purchasing of the selected goods and services may be indicated by requesting and receiving a web page or other electronic form by which a customer may enter payment, shipping and other details to be transmitted to the network-based commerce system to complete the purchase transaction. It will be appreciated that a variety of other online processes in which a user needs to supply various pieces of information to complete a transaction or operation may also make use of electronic forms. A user may use a remote machine (e.g., not be directly interacting with the machine that served the form) to receive the electronic document(s) including or comprising the form, and transmit the values filled into the form and their associations with form elements.

An example embodiment of a checkout web page or other electronic form as it may be presented within a graphical user interface displayed on a remote machine to a customer is illustrated in FIG. 1.

Referring to FIG. 1, it will be appreciated that the user interface window 102 entitled "Checkout" presents a graphical user interface depicting an electronic form. This electronic form, for the purposes of example, may be considered to have been served by the network-based commerce system "some_merchant.com" as evidenced by the Uniform Resource Locator (URL) 104 serving to identify the electronic form presented in the user interface window 102. The electronic form illustrated in FIG. 1 includes various elements including a summary 106 of the transaction or purchase that the electronic form is to enable a user to carry out as well as graphical representations of a number of form elements including the name 110 of a customer or other entity wishing to purchase merchandise, the address 114 and city, state and zip code 118 to which the merchandise being ordered is to be shipped. In addition, the example electronic form presented by the graphical user interface illustrated in window 102 includes a field for the entry of a credit card number 122 and a checkbox 126 to indicate whether the billing address for the credit card number is the same as the shipping address. Finally, the electronic form illustrated in window 102 includes a "Place Order" button 128.

When a customer or other user wishes to complete a purchase and place the order for the purchased goods or services, the user may enter the name of the customer (or other entity on whose behalf the purchase is being made) into text fields 110, may enter other information into the other text fields 114, 118, 122 and may actuate the checkbox 126. Once this data has been entered, the user may click the "Place Order" button 128, whereupon the web browser or other application running at the remote machine may associate the various data items entered by the user by the GUI with their corresponding electronic form elements and transmit this data and these associations to the network-based commerce system. Once this data is received by the network-based commerce system may process the order, request a credit via the credit card number entered, serve another form to request credit card billing address, or take other action.

Although a single-page electronic form illustrated in FIG. 1, in some embodiments, network-based commerce systems or other electronic-form serving systems may present a sequence including multiple electronic forms that a user is to fill or navigate in order to carry out the purchase of goods or services or other transactions. Not all of the electronic documents in a sequence of electronic forms need be themselves have fields for receiving input; in some embodiments one or more electronic documents in a sequence may include submit-type buttons that permit navigation to a next electronic document or form without necessarily submitting data entered in fields. Besides purchases, form serving may be used in various fields, such as for example registering for online services, online newsletter subscriptions or other services. For example, in some embodiments a network-based commerce system may require a customer or other user to fill out the first electronic form including a shipping address, a second electronic form including billing information and a third electronic form in which the user is to enter gift certificate numbers, discount coupon numbers or other information. In addition, some network-based commerce systems encourage a user to enter a username, membership number, or other data specific to a particular online merchant. For a customer who uses a number of different network-based commerce systems and/or carries out a number of transactions, the repeated entry of the name of the customer (or other entity on whose behalf the customer is acting), addresses, credit card numbers, account numbers and other data may become burdensome. Thus in some embodiments, a network-based payment system or other trusted third party may be entrusted to store various information about entities on whose behalf electronic purchases and other online transactions may be made. Such a third party may, at the request of users, provide scripts or other machine-executable instructions, which may be generated as needed and customized to the various forms that a customer may wish to have automatically filled. Processes in which electronic forms are filled (either partially or completely) automatically by a machine may be termed "electronic form automation."

While this specification describes embodiments in which various types of data is transmitted and received or otherwise communicated via a network such as, for example, the Internet, it will be appreciated that various transmission media such as wireless networking, wired and wireless telephony, text messaging, internet telephony and many other media may be used to facilitate the various transmissions, receptions and acceptances described herein in regard to example systems for facilitating the transfer of value. Further, it will be appreciated that some embodiments, communication among the various systems and modules by be synchronous, asynchronous, or may be indirect, such as by one module storing a communication in a database or other storage device and indicating to another module its presence, without communicating its content.

For the purposes of this specification, a "module" includes an identifiable portion of code or data or computational object to achieve a particular function, operation, processing, or procedure.

Electronic form automation may have several example technical benefits. For example, using observation-based form field mapping techniques increases the accuracy of electronic form automation, and decreases the need for a network-based payment system to custom program or manually map form fields.

Example Systems Used in Electronic Form Automation

FIG. 2 is a block diagram of a system 200 that includes various modules and components that may be used to carry out electronic form automation, according to an example embodiment. System 200 includes a remote machine 202 such as, for example, a home computer or other computer located at the site of an entity or other customer. This remote machine 202 may include a web browser or other communications applications that are able to display GUI representations of electronic forms, receive user input into the electronic form representations, and transmit the input to the server of the form, or to another machine. In addition, system 200 may also include a network-based commerce system 206 including a web server 210. As mentioned above, some embodiments may be used in contexts other than commerce. In some embodiments, this web server 210 may be for serving electronic forms and receiving electronic form data as well as for serving other types of electronic content (e.g., web pages without form elements, e-mail, etc). The remote machine 202 may be connected to the network-based commerce system 206 via a network 204 such as, for example, the Internet, intranets, wireless networks, telephone networks, etc. The system 200 also may include a network-based payment system 208. The network-based payment system 208 may include a number of modules and components such as, for example, communication module 212, which may in some embodiments be a web server or other module capable of communicating with the remote machine 202 via the network 204. The network-based payment system 208 may also include an identification module 214 that may be used to validate logins and other requests transmitted by the remote machine 202 purportedly on the behalf of entities. The network-based payment system 208 may also include a data store 218 for storing information about electronic forms, entities, electronic form sequences and other information. This data store 218 may be connected to or accessed by other modules via a data access module 216. For example, the data store 218 may be a relational database and the data access module 216 may be a relational database access application. The network-based payment system 208 may also include an instruction generation module 220 which may be used to generate instructions executable by the remote machine 202 to automatically fill in or read or record from electronic forms. The network-based payment system 208 may include a learning module 221. This learning module may be used to populate the data store 218 with data learned by recording form value entry to learn the associations between form elements and entity attribute values, as will be described below.

Example Data Structures in Electronic Form Automation

FIG. 3 illustrates an example of an electronic form 302, according to an example embodiment. The electronic form 302 illustrated in FIG. 3 is written in HyperText Markup Language (HTML). It will be appreciated that in some embodiments Extensible Markup Language (XML) or some other markup language or format may be used for communicating and representing electronic forms.

The electronic form 302 may include a number of features. For example, the electronic form 302 may include an action tag 308 to indicate the URL of the electronic document to be requested after the submission of the value to form element association data as well as an input form element 310, a button element describing a "Place Order" button that a user may click once the electronic form elements, as represented in a graphical user interface, has been filled out. Finally the electronic form 302 may include other form elements such as, for example, a text box indicated by the dashed box 304. Within, or otherwise associated with form elements, may be one or more pieces of form element identifying data such as, for example, the string (e.g., form element identifier) "FIRST_NAME" indicated by the bracket 306. When a user clicks a submit button on a user interface representing an electronic form, the value entered into an input field may be transmitted to the server of the form or other destination in association with the form element identifying data to indicate into which user interface element the value was entered.

Figure 4:
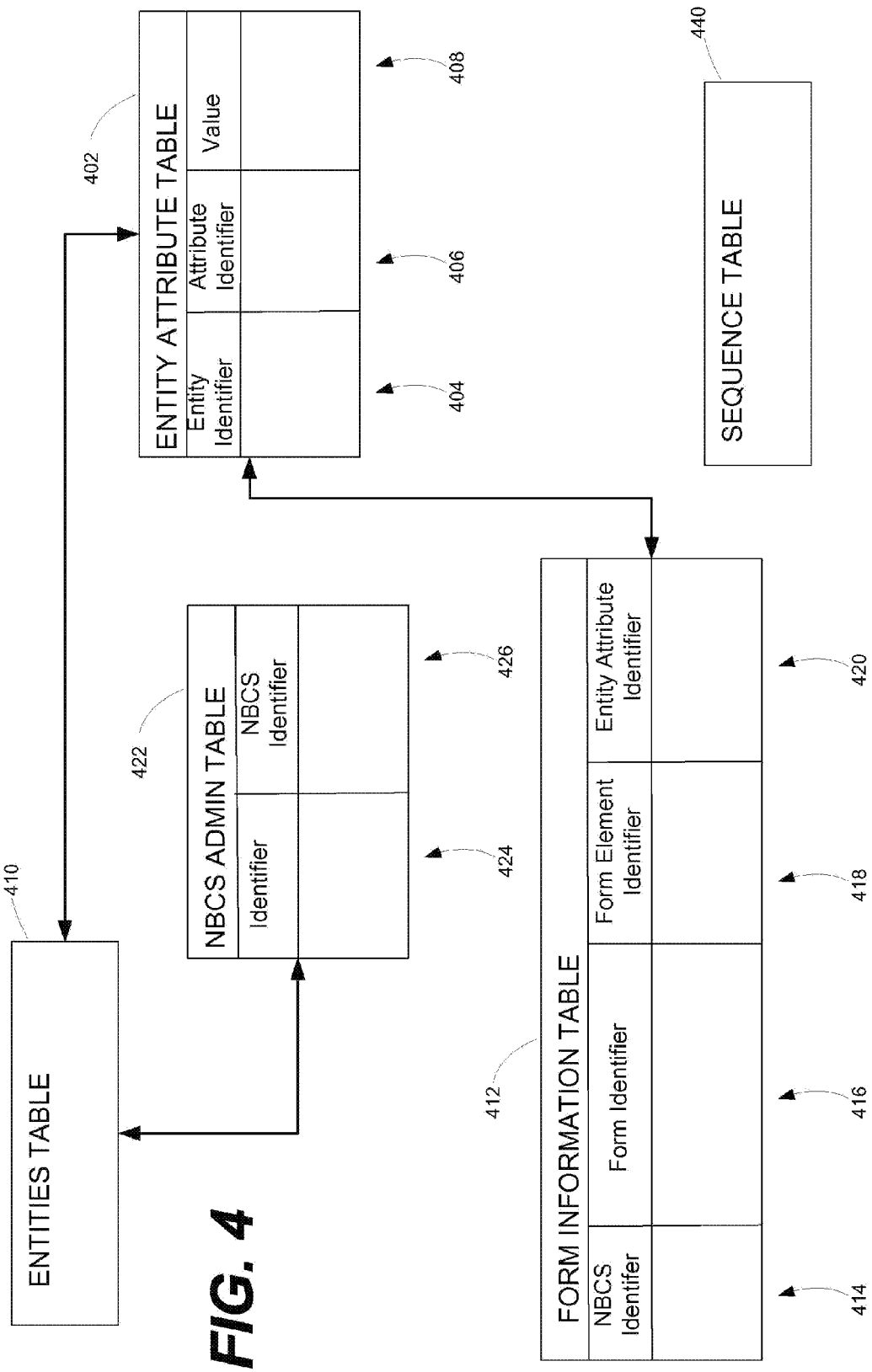
FIG. 4 illustrates an overview of a number of data structures that may be used by a network-based payment system, according to an example embodiment.

FIG. 4 illustrates an overview of a number of data structures that may be used by a network-based payment system 208, according to an example embodiment. These data structures may in some embodiments be stored in data store 218 and/or maintained by the network-based payment system 208.

FIG. 4 includes a number of data structures including an entities table 410, a network-based commerce system administrator table 422, an entity attribute table 402, a sequence table 440 and a form information table 412. The entities table 410 may in some embodiments store information about customers or other entities on whose behalf data may be stored by the network-based payment system 208. For example, an entities table may include usernames, passwords and other account information. The entity attribute table 402 may include an entity identifier column 404, an entity attribute name column 406 and an entity attribute value column 408. The entity identifier column may be a key into the entities table 410. A row of the entity attribute table 402 may, in some embodiments, associate a value with an entity identifier and an attribute name. The structure of the entity attribute table 402 is described in more detail below with respect to FIG. 5. In some embodiments, the entities table 410 may be used by the identification module 214 to determine an entity identifier based on credentials. Credentials may include a login username and password a user has previously registered with the network-based payment system 208 to represent the user or other entity.

FIG. 4 includes a form information table 412. The form information table 412 may include a number of columns including a network-based commerce system (NBCS) identifier column 414, a form identifier column 416, a form element identifier column 418 and entity attribute identifier column 420. The form information table 412 may be considered as a mapping from a form identifier (such as, for example, a network-based commerce system URL) and a form element identifier to an entity attribute identifier. The content of the form information table 412 is discussed in more detail with respect to FIG. 6, below.

FIG. 4 also includes a sequence table 440. This sequence table holds details about sequences of one or more electronic forms. For example, in some network-based commerce systems as described above, a sequence of one or more forms may be filled out to effect a purchase or other transaction. The sequence table 440 may be used to store information about these multi-form input flows. The sequence table 440 and its use is described below in the discussion related to FIG. 8.

Finally, FIG. 4 includes a network-based commerce system (NBCS) administrator table 422. This table may include an entity identifier column 424, which may be a key into the entities table 410 and an NBCS identifier column serving as a key into the form information table 412. This table may serve to map from the entity identifiers of known system administrators of the various NBCS's for which network-based payment system 208 stores information to their administered NBCS's. Its use will be described in further detail below.

FIG. 5 illustrates an example of an entity attribute table 502, according to an example embodiment. Entity attribute table 502 is illustrated as including information stored behalf of two entities—entity identifiers E23653 and G10085. In the example of FIG. 5, the entity identifier E23653 corresponds to a person named Darren Carbondiox, while entity identifier G10085 corresponds to a person named Anna Caro. It will be appreciated that entities may be corporate entities and other non-natural persons. For each entity identifier illustrated in the entity attribute table 502, a number of name/value pairs are stored. It will be appreciated that for consistency of data processing, a network-based payment system 208 may find it desirable to use the same attribute name to designate the same attributes across various entities. For example, in the entity attribute table 502, it will be appreciated that the same attribute names such as FIRST_NAME, LAST_NAME, ADDRESS, CITY, STATE, ZIP, CREDITCARD, etc. are used as entity attribute identifiers for both entities.

FIG. 6 illustrates an entities table 602 and a form information table 606, according to example embodiments.

The entities table 602 illustrates examples of entity identifiers. It will be appreciated that these two entities described by the example entities table 602 correspond to the two entities for which attribute values are stored in the example entity attribute value 502. The entities table 602 may include a name of the entity as well as a password and an email address (or other credentials). It will be appreciated that from the password and email address the identification module 214 may be able to determine the corresponding entity identifier.

The form information table 606 illustrates an example of how a form identifier such as, for example, a uniform resource location (URL) and a form element identifier or other form element identifying data may be mapped or otherwise associated with an entity attribute identifier. In some embodiments, one function of a form information table, such as the form information table 606, may be to provide a standardization function in which various form element identifiers used within the various electronic forms may map to the same entity attribute identifier. This may permit the network-based payment system 208 to generate scripts (e.g., via instruction generation module 220) to automatically fill in the various electronic forms with entity attribute values regardless of the form element identifying convention used by a particular electronic form. The form information table 606 may include a number of columns including the network-based commerce system (NBCS) identifier, the form identifier, the form element identifier, and the entity attribute identifier. In form information table 606, both an electronic form having a form identifier checkout.htm 608 and another form checkout2.htm 610 are included. For example, checkout.htm 608 may be used by a network-based commerce system, some_merchant.com to request identification data from a purchaser while checkout2.htm 610 may be used to request credit card information or other billing information from a customer. This relation is depicted graphically in FIG. 7.

Figure 7:
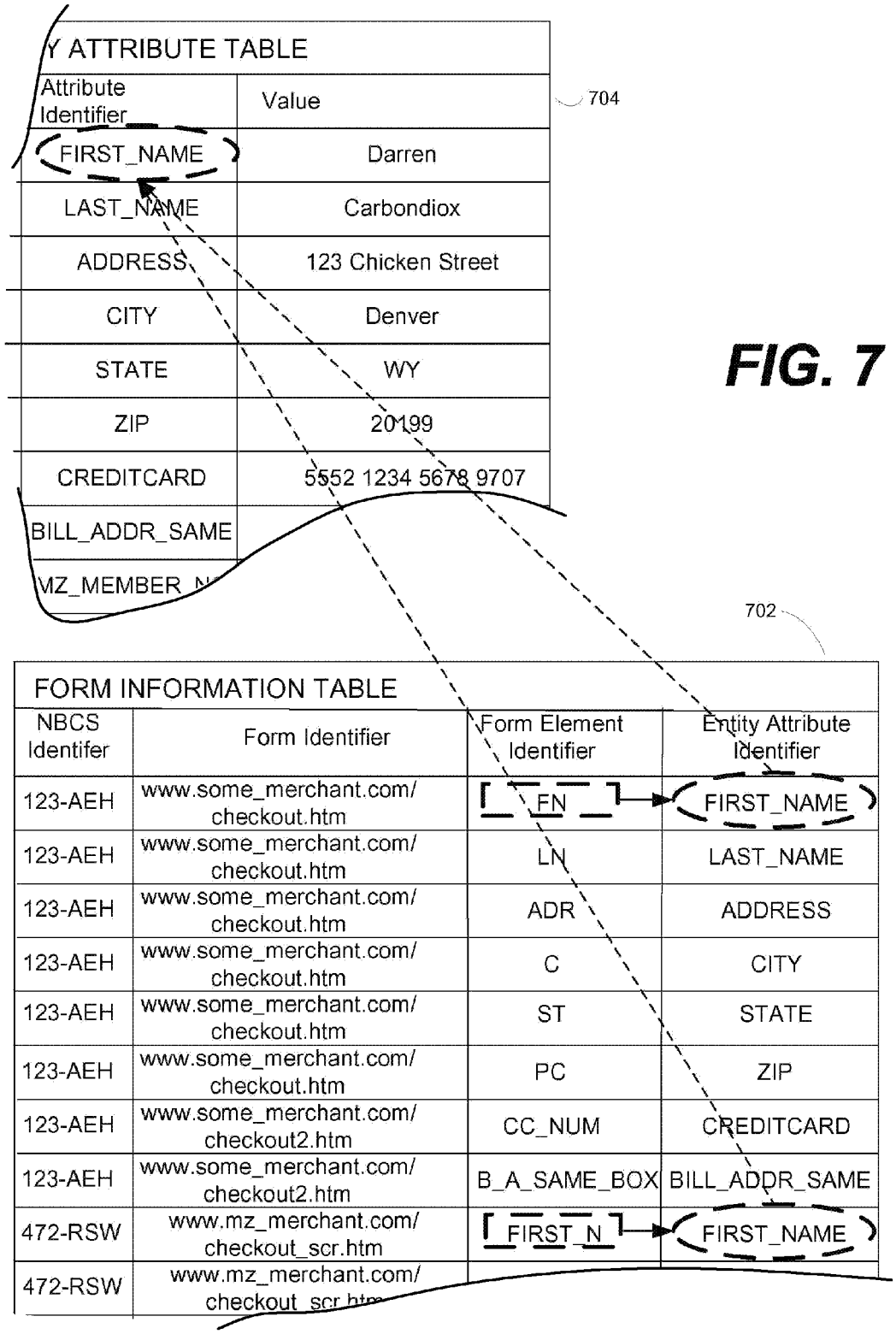
FIG. 7 illustrates a relationship between a form information table and an entity attribute table, according to an example embodiment.

FIG. 7 illustrates a relationship between a form information table 702 and an entity attribute table 704, according to an example embodiment.

In the form information table 702, the form element identifier FN found in some_merchant.com/checkout.htm electronic form is noted as corresponding to the entity attribute identifier FIRST_NAME, while the form element identifier FIRST_N of www.mz_merchant.com/checkoutscr.htm also corresponds to the same FIRST_NAME entity attribute identifier. Thus, it is possible for a network-based payment system to generate scripts to effect the automatic filling of various forms as long as the relationship between the 'idiosyncratic' form element identifiers of the various forms to the uniform entity attribute identifiers serving to match values to the entities for whom the network-based payment system 208 stores data is known.

Figure 8:
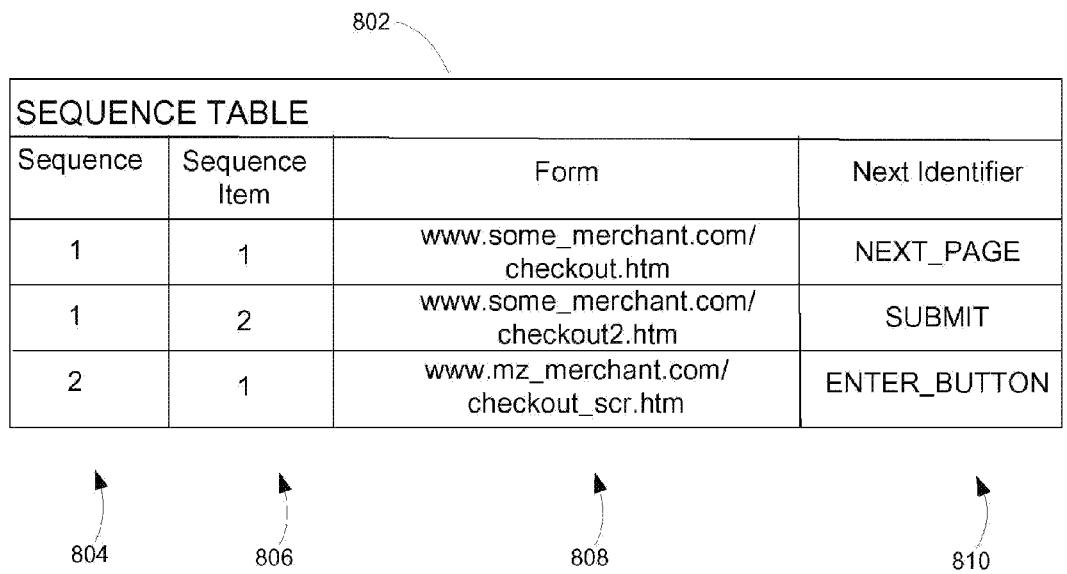
FIG. 8 illustrates a sequence table, according to an example embodiment.

FIG. 8 illustrates a sequence table 802, according to an example embodiment. The sequence table 802 may be used by a network-based payment system 208 to store sequences of forms, such as for example when a network-based commerce system expects a user to fill out and/or otherwise traverse more than one electronic form to effect a transaction. The sequence table 802 may include a sequence column 804, a sequence item column 806, a form column 808 and a next identifier column 810. The sequence column 804 may be used to store identifying data to indicate a sequence to which a form belongs. The sequence item column 806 may describe the order of forms within a sequence. For example, in a sequence of forms maintained by some_merchant.com, the user during a checkout may be expected to fill in form checkout.html first and then fill out the online electronic form checkout2.html next. The next identifier column 810 may indicate the name of a button element or other affordance to be clicked or otherwise actuated at the conclusion of filling out the corresponding form. For example, in the sequence table 802, once the checkout.htm form has been filled out, the user may be expected, via a browser, to click on a "Submit Form" button element whose identifier is NEXT_PAGE. It will be appreciated that sequences may be stored in a number of different ways. The sequence table 802 may be used by the network-based payment system 208, in some embodiments, by the instruction generation module 220 to generate scripts capable of filling in and traversing multiple forms within a sequence such as, for example, a checkout flow.

Example Processes and User Interfaces Associated with Electronic Form Automation In some embodiments, a network-based commerce system or other system to serve electronic forms and/or electronic form sequences to a remote machine may include a button element or other clickable element or affordance on electronic documents or other element on electronic documents served to a remote machine. This element may, when a rendering of it is clicked within a user interface presented by a web browser, open a sub-window which the user of the remote machine is connected to a network-based payment system 208. This button may be labeled "Auto-Checkout" or "Form Automation" or similar label to distinguish it to a user. The server of the electronic document including such a button element may also include form identifying data that may be received by the network-based payment system 208 and thereby processed.

An example of such a button element is illustrated in Table 1.

TABLE 1

```
<a
href="javascript:void(window.open('http://www.xyz_pay.com/
autoCheckout.htm','AC','height=200,width=450,top=20,left=20,
scrollbars=no,location=1,resizable=1'))">
<img src=files/xyz_auto_checkout.gif border=0>
</a>
```

As a result of the user clicking on the button element, a separate window (e.g., the sub-window) may be opened by a web browser or other application on the user's machine. Once the user has connected to the network-based payment system 208 (e.g., www.xyz_pay.com in Table 1) through this window, a web page may be presented within the sub-window (e.g., autoCheckout.htm of Table 1) to solicit entity credentials such as for example a username and password.

In some embodiments, depending on the entity identification data entered by the user and the configuration and identification of the form or other electronic document that included the button element, a number of possible actions may be carried out by the network-based payment system 208.

Figure 9:
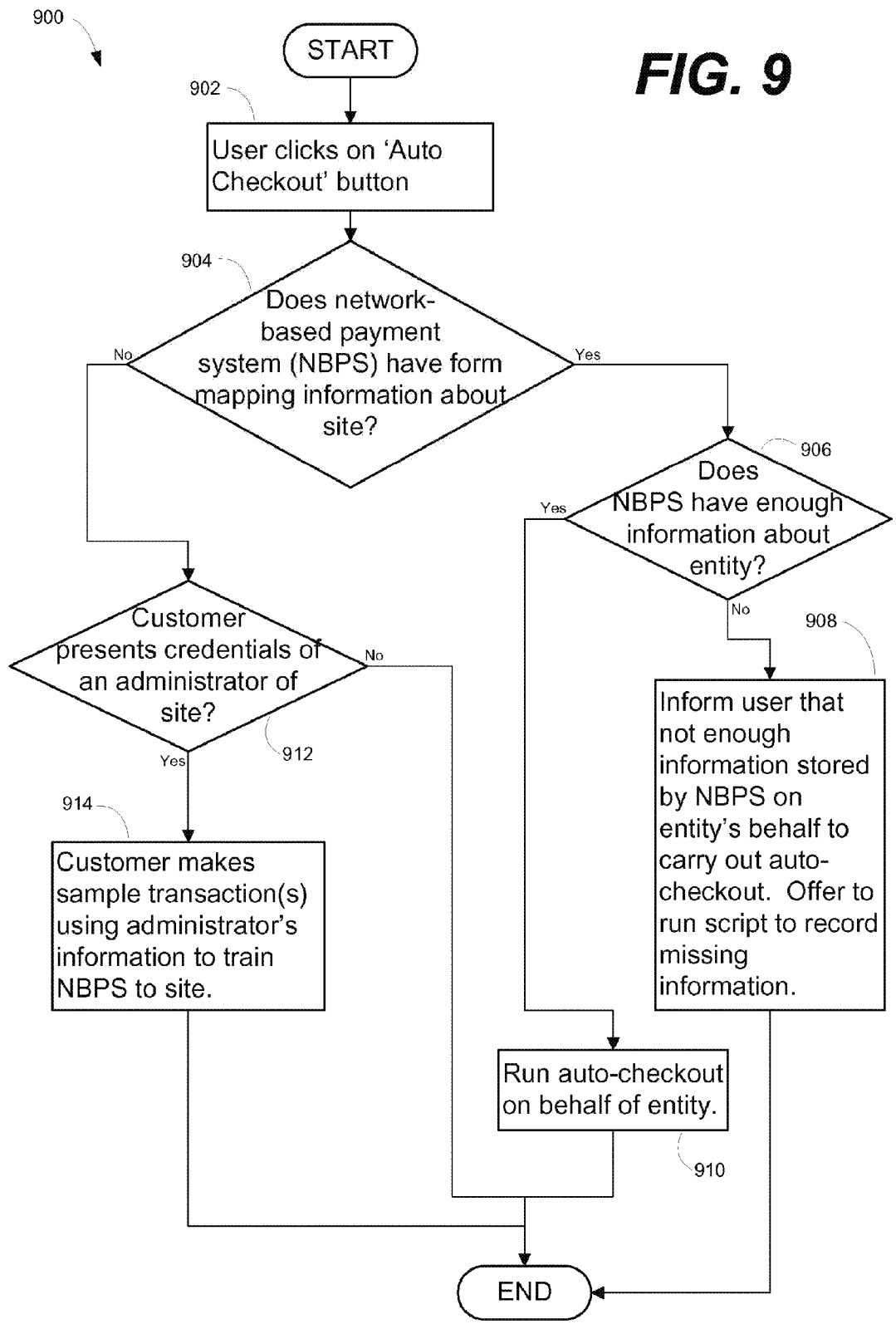
FIG. 9 is a flowchart of an overview process describing a number of example processes that may be carried out by a network-based payment system, once the network-based payment system has received credential of an entity, according to an example embodiment.

FIG. 9 is a flowchart of an overview process 900 describing a number of example processes that may be carried out by a network-based payment system 208, once the network-based payment system 208 has received credential of an entity, according to an example embodiment.

At block 902, a user may click on an auto checkout request button or other button element (e.g., such as a GUI representation of that shown in Table 1) on an electronic document as rendered by a web browser or other communication application running on a user's remote machine. In response, the user's web browser may open a connection to the network-based payment system 208 (e.g., in a sub-window) via its communication module 212 by which the credentials of an entity, such as the user or entity on whose behalf the user is logging in, may be requested. Once the user has entered these credentials at block 912, the network-based payment system 208 may determine whether it has form mapping information about the site that served the electronic document that includes the button element. If so, at decision box 906, the network-based payment system may determine whether it has enough information about the entity whose credentials were presented to carry out an automatic form filling. If not, at block 908, the network-based payment system 208 may inform the user that not enough information is stored on the entity's behalf to facilitate automated form-filling, and, instead the network-based payment system 208 may serve a script to run (e.g., within the sub-window) to record the missing information as the user works through the electronic form sequence presented in the main window. On the other hand, if the network-based payment system does have enough information about the entity at block 910, the network-based payment system 208 may provide form-filling instructions to enable the user's machine to carry out an automatic form filling process on behalf of the entity via a script as will be described in further detail below.

Returning to decision box 904: if the network-based payment system 208 does not have form mapping information about the site, the network-based payment system may determine whether the user is an administrator of the site (such as a network-based commerce system) at decision box 912. If the user is an administrator, such as by presenting the credentials of an administrator of the network-based commerce system, then at block 914, the user may make a sample transaction in order to train the network-based payment system 208 to the site. This training process is described in further detail below. In some embodiments, any user (who need not be an administrator of the network-based commerce system 206) may make a sample transaction by which the network-based payment system 208 to the site; in such embodiments a transaction by any user on behalf of an entity for which the network-based payment system 208 has sufficient information may be used in this training process. It will be appreciated that when a network-based payment system doesn't have enough information about the entity, the user need not, in some embodiments, input information into the electronic form served by the network-based commerce system 206, but may input their info into the sub-window.

FIG. 10 and FIG. 11 include a flowchart of process 1000 or carrying out automatic filling of electronic forms and form sequences, according to an example embodiment.

FIG. 10 includes example processing that may be carried out by a network-based payment system 208, a network-based commerce system 206 and a remote (e.g., user) machine 202. The process may begin at block 1002, in which the network-based commerce system 206, for example, via its web server 210, may transmit an electronic form (e.g., the first electronic form of a sequence) to a remote machine 202. This transmission may be in response to a user of the remote machine 202 wishing to proceed with the purchase of goods or services or other transaction. The electronic form transmitted in block 1002 need not include actual form data input elements, such as text fields, and may include an auto checkout or similar form-filling script invocation button or buttons similar to the button element included in Table 1 above. (An example of such a button element is illustrated at 1304 in FIG. 13, described below)

At block 1004, after a remote machine 202 receives an electronic form or other electronic document from the network-based commerce system, including e.g. the form-filling script invocation button element, a user of the remote machine may click on or otherwise signal or actuate the button element or other similar affordance. In response to clicking on this button (or other actuatable GUI) element, the web browser or other communication application running on the remote machine 202 may open a sub-window on the display of the remote machine 202. This sub-window may be populated with a GUI representation of an electronic form downloaded from the network-based payment system 208, to allow the user of the remote machine to transmit credentials to the network-based payment system 208. (e.g., block 1008) These credentials may be transmitted to the network-based payment system 208 and may be received by the communication module 212. In addition, form identifying data (e.g., the URL of the electronic form that includes the button element clicked) may be transmitted in addition to the network-based payment system 208. In some embodiments, an "http_referer" variable may be transmitted to the network-based payment system 208 when the user clicks the button in table 1. The http_referer variable may be sent to a web server of a subsequent page whenever a user clicks on a link on a page. At block 1010, the network-based payment system 208, in some embodiments the identification module 214, may attempt to verify the credentials received from the user. At decision box 1012, the credentials may be verified and if the credentials do not correspond or validate an entity on whose behalf the network-based payment system 208 is storing information, at block 1014 an error message may be transmitted to the remote machine to this effect. If the credentials are verified, processing may continue at block 1116 of FIG. 11.

FIG. 11 is a continuation of the process illustrated in FIG. 10. At block 1116 the network-based payment system 208 may transmit a Global Unique Identifier (GUID) or other identifier to the remote machine 202. This GUID may be stored by the network-based payment system 208 in association with the entity identifier (e.g., determined based on entity-specific data, such as for example the credentials) and the form identifying data, such as for example a URL to identify a sequence of one or more electronic forms. This GUID may be transmitted to the remote machine later in the form automation process. For example, the GUID may be sent by the network-based payment system 208 to be stored on the remote machine's 202 cookie. At block 1118, the remote machine may receive the GUID or other identifier which may in some embodiments be stored as a cookie.

At block 1118, the sub-window being displayed on the remote machine 202 may be redirected to an electronic document served by the network-based commerce system 206 (in some embodiments by web server 210), which in some embodiments may be done to permit a script of form-filling instructions to have the same apparent domain name as the electronic form(s) that the form-filling instructions are to affect. An example of such an electronic document in the form of an HTML page is illustrated in Table 2.

TABLE 2

<html>
<head><title>XYZ Pay Automation</title></head>
<body>
Thank you Darren Carbondiox!
Now entering your stored information...
<script type="text/javascript"
src="http://xyz_pay.com/fa_script.js"></script>
</body></html>

It will be appreciated that the redirection of the sub-window to retrieve the script referencing HTML, such as illustrated in Table 3, may be necessary to allow a script served from a network-based payment system 208, to be able to enter values or otherwise modify an electronic form illustrated in the original sub-window by virtue of sharing the same domain name.

At block 1120, the remote machine 202 may render the script referencing HTML received from the network-based commerce system 206, such as the HTML or other electronic document illustrated in Table 2. At block 1120, during the rendering process in response to encountering the script instruction, the remote machine 202 may request a script from the network-based payment system 208 transmitting the GUID and other necessary data. Table 3 illustrates an example of such a script, as one may be implemented in JavaScript.

TABLE 3 opener.document.for5.FN.value ="Darren";
opener.document.for5.LN.value ="Carbondiox";
opener.document.for5.ADR.value ="123 Chicken Street";
opener.document.for5.C.value ="Denver";
opener.document.for5.ST.value ="WY";
opener.document.for5.PC.value ="20199";
opener.document.for5.ship_to_zip.value ="95131";
opener.document.for5.CC_NUM.value ="5552 1235 5678 9707";
opener.document.for5.B_A_SAME_BOX.selected = true;
opener.document.for5.submit( );
setTimeout(1000);

Once this script request, including the transmitting of GUID or other data, is received by the network-based payment system 208, such as by the communication module 212, the network-based payment system 208 may determine the form identifying data and the entity identifier associated with the GUID. It will be appreciated that although the HTML page (e.g. such as shown in Table 3) may appear to be to retrieve a specific script and execute it during the rendering of the page, this script may in fact be generated according to the form or form sequence to be filled and the entity on whose behalf the filling is to be done.

The script may be generated by the instruction generation module 220. The script generated may include form filling instructions that are operable to cause the remote machine 202 to automatically fill in the sequence of one or more electronic forms presented by the network-based commerce system 206.

The script generated at block 1124 may include a number of form filling instructions operable to cause the remote machine to automatically fill in a sequence of one or more electronic forms presented by the network-based commerce system 206 or otherwise automatically associate an entity's attribute value with a form element in an electronic form. This script may be operable to automatically fill and submit a sequence of forms, such as for example by interleaving instructions to automatically fill in form elements with instructions to automatically actuate submit buttons or other form of submission affordances within the various electronic forms or other electronic documents comprising the sequence, such as to proceed from one electronic form to the next. The script may also serve to show progress updates within the sub-window for the users' benefit.

In order to generate a particular form filling instruction operable to fill a particular form element, the instruction generation module 220 may access from the data store 218 an entity attribute value corresponding or otherwise associated with the entity identifier, the form filling instructions thus being operable to enter the entity attribute value so accessed into the electronic form.

This accessing process may in some embodiments include several operations. In some embodiments the instruction generation module 220, at the commencement of the generation of form filling instructions operable to associate an entity attribute value with a form element, may select form element identifying data corresponding to the form element within a particular electronic form within a sequence of electronic forms for which instructions are to be generated.

The instruction generation module 220 may select an entity attribute identifier from a data store 218 where the entity attribute identifier is associated with a target form identifying data (e.g., where a target form may be an electronic form into which, or from which, data is to be entered or recorded) and a form element identifying data. For example, suppose that in referring to FIG. 6 instructions were being generated to fill in a form element whose form element identifying data is CC_NUM 612 within the electronic form checkout2.html served by some_merchant.com 610. In that example, the entity attribute identifier selected may be the entity attribute identifier CREDITCARD 614. Finally, the instruction generation module 220 may select the entity attribute value from the data store that is associated with the entity attribute identifier and the entity identifier. For example, to continue the example above, the instruction generation module having ascertained (e.g., from the GUID) the entity identifier, for example E23653, within the entity attribute table 502 and the entity attribute identifier CREDITCARD 614 from the form information table 606, may select the attribute value 5552123556789707 504 from the entity attribute table 502. Thus, it may be this value that the instruction generation module 220 may generate instructions to automatically enter into the checkout2.html 610 form in the form element corresponding to CC_NUM 612, within a script (such as in Table 3) generated on behalf of the entity identified by E23653.

In generating the script, a form information table, such as that shown at 606 may be used or other mechanism invoked, such as for assembling scripts for filling multiple forms.

At block 1126, the script may be transmitted to the remote machine 202 whereupon at block 1128 the script may be executed within the remote machine to automatically fill in the sequence of one or more electronic forms in the main window and a submission of the form entries in the main window to the network-based commerce system 206. Finally at block 1130, the form entries may be received by the network-based commerce system 206 and the network-based commerce system 206 or other system may process the checkout or other transaction.

In some embodiments, an electronic form served by a network-based commerce system 206 may be via HTTPS (or other secure protocol). In these embodiments, a non-secure page cannot talk to, fill forms, or read forms on a secure page. In those embodiments, a script generated by an instruction generation module 220 may include instructions to reload the page on which it resides as a secure page prior to executing. For example, the script illustrated in Table 3 may include a line: "window.location.href='https://www.some_merchant.com/checkout_secure.htm?page=2';" or the like. In these embodiments, the "checkout_secure.htm" page would be as illustrated in Table 2.

FIG. 12 is a flowchart of a process 1200 for generating and transmitting form filling instructions to a remote machine, according to an example embodiment.

At block 1202, the network-based payment system 208 may receive entity-identifying data, such as for example a cookie including a GUID from which an entity identifier may be determined or a user name, password, or other credential, and form identifying data. This form identifying data may identity a sequence of one or more electronic forms such as for example by identifying the Uniform Resource Locator (URL) of the initial form or document in the sequence. Within the sequence of one or more electronic forms, the sequence may include one or more target electronic forms having one or more form elements. In some embodiments, the entity-identifying data and form identifying data may be received by a communication module 212.

At block 1204, an entity identifier may be determined based on the entity-identifying data. This entity identifier may be to identify the entity on whose behalf the entity-identifying data was received. Beginning at block 1206, a series of operations may be carried out to enable an instruction generation module to generate instructions to automatically fill in the various form elements within the various target electronic forms that comprise the sequence of forms. For each target electronic form, form element identifying data corresponding to a form element within the target electronic form may be selected. At block 1208, an entity attribute identifier may be selected. The selection of the entity attribute identifier may be based on the target form identifying data (such as for example the URL of a particular electronic form within a sequence of electronic forms) and form element identifying data. Also, in block 1208, once an entity attribute identifier has been selected, an entity attribute value may be selected based on the entity attribute identifier and the entity identifier. At block 1210, form filling instructions operable to cause a machine to automatically associate the entity attribute with the form element may be created. At decision block 1212, a determination may be made whether more form elements need to be processed within the sequence of electronic forms for which form filling instructions are being generated. If there are more form elements to be processed within a current target electronic form, processing may continue at block 1206. If there are no more form elements to process within a particular target electronic form within a sequence, processing may continue with the next target electronic form in the sequence with the collection of all form filling instructions. The form filling instructions may further include instructions to submit the target electronic form in preparation for automatically filling out the next electronic form in the sequence.

On the other hand, if at decision block 1212 there are no more form elements to be processed in the sequence of electronic forms, then processing may continue at block 1215 with the transmission of all the form filling instructions to the remote machine, such as for example all the form filling instructions to fill out all the form elements within the various electronic forms that comprise the sequence. As discussed above, these form filling instructions may be encapsulated within a script served to a remote machine in response to a request from the remote machine.

It will be appreciated that in some embodiments, a web browser toolbar or other plug in may be used to carry out the operations illustrated in FIGS. 10 through 13. For example, a user of a remote machine 202 may download a toolbar or other "plug-in" application (e.g., from a network-based payment system 208) when a user wishes to be able to request automatic filling of electronic forms. Once such a toolbar or plug-in has been integrated into a communication application on the remote machine 202, a user may enter an entity's credentials into the toolbar whereupon the toolbar may transmit the credentials along with an identification of the URL to the initial electronic form or other electronic document in a sequence to the network-based payment system 208. In response, the network-based payment system may use a process analogous to that illustrated in FIG. 12 to generate and transmit a script back to the toolbar or plug-in for execution by the toolbar or other plug in, or within the web browser, to automatically fill in the sequence of the one or more electronic forms.

It will be appreciated that not every electronic document within an electronic form sequence need have form elements that may be filled in by a user. For example, a sequence of electronic forms may include several electronic documents that may be considered electronic forms, but merely permit a user to click a "next page" type button to proceed to the next electronic document or form in the sequence.

Figure 14:
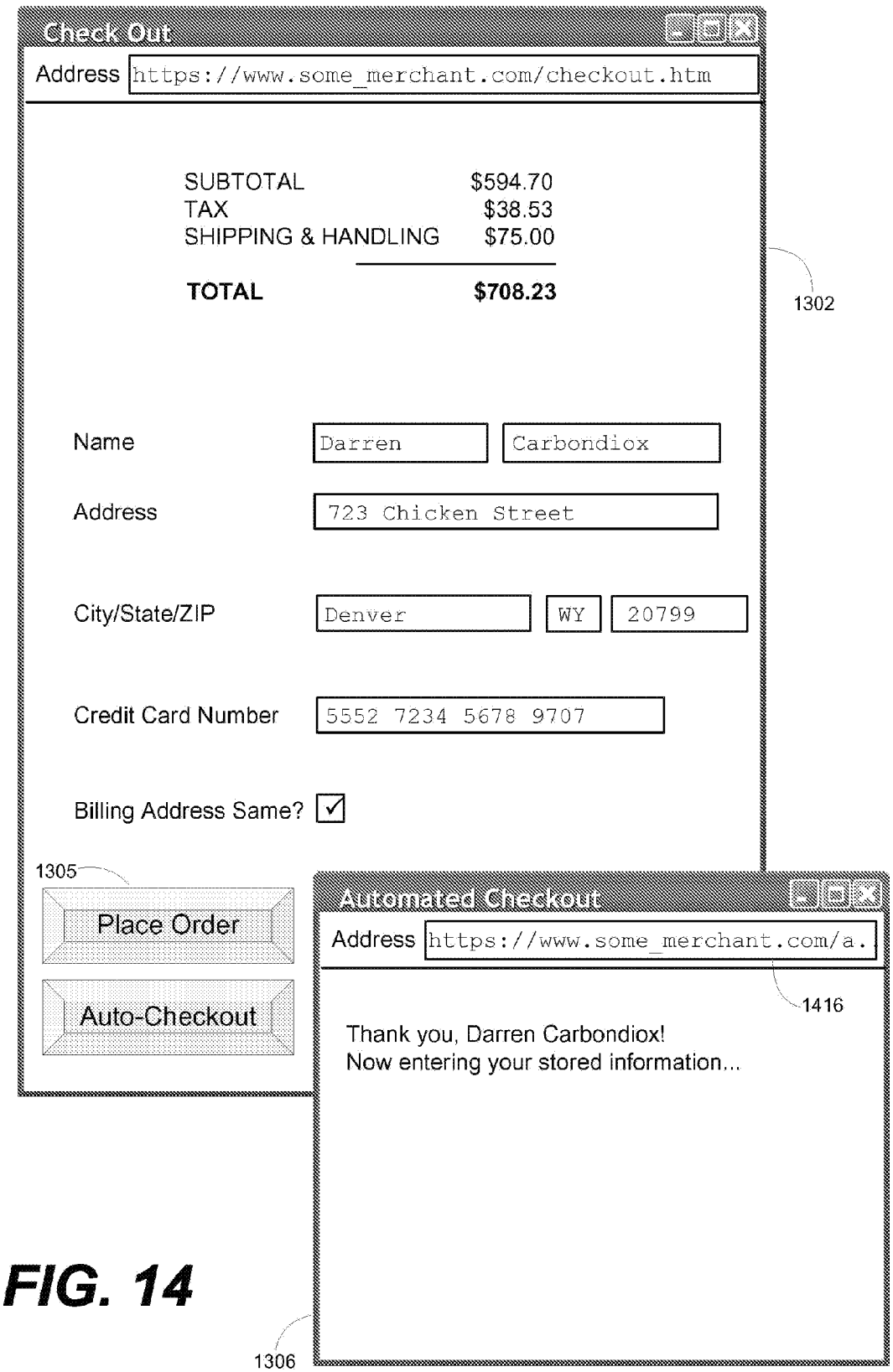

FIG. 13 and FIG. 14 illustrate a user interface for electronic form automation, according to an example embodiment.

In FIG. 13, a user interface 1302 in a first or main window, such as for example a window presented on a remote machine by a web browser application (e.g., a web browser window), is illustrated. The user interface 1302 may for example be presented in response to a user retrieving an electronic form from a secure web server, such as for example a web server 210 in a network-based commerce system 206. In the example illustrated in FIG. 13, an electronic form whose URL is illustrated in the address field 1303, has been requested and received by the remote machine. The electronic form has thus been rendered within the user interface 1302. The electronic form includes form elements for the entry of a name, address, city, state, zip code, credit card number and a checkbox indicating whether the billing address is the same as the address the user has entered in the form. In addition to the various fields form elements, the electronic form illustrated in the user interface 1302 may in some embodiments be referred to as a main window and includes two button elements: An "Auto Checkout" button 1304 and a "Place Order" button 1305. In the absence of electronic form automation, the user wishing to place the order illustrated in the user interface 1302 may enter an entity name, address and other information and then click on the "Place Order" button 1305. On the other hand, the network-based commerce system 206 or other electronic form server may provide the "Auto checkout" button 1304 (e.g., via a form element as illustrated in Table 1). The "Auto checkout" button 1304 when clicked may cause the web browser application running on the remote machine 202 to open a second window 1306. The second window, by contrast with the main window displaying user interface 1302, may direct the user to a network-based payment system which a second electronic form having a URL indicated in address box 1308 may be downloaded.

As illustrated in FIG. 13, the second window 1306 may include electronic form elements 1310 and 1313 to allow the entry of credentials for an entity such as for example an email address and/or password. Once these credentials have been entered, the user may click a continue button 1314, such as by positioning a mouse pointer 1316 onto the continue button and click a mouse attached to the remote machine.

In FIG. 14, the user interfaces 1302 and 1306 are illustrated in a state after the user has clicked the continue button 1314 of FIG. 13, according to an example embodiment. It will be appreciated that the second window 1306 has been redirected to the web page on the network-based commerce system's site as evidenced by the URL in the address box 1416. As illustrated in user interface shown in the second window 1306, a confirmation message has been provided to the user and in the rendering of the page (e.g., such as for example in Table 2) indicated by the URL 1416 that includes the acknowledgement message. A script (e.g., such as for example as illustrated in Table 3) provided by the network-based payment system 208 may have been downloaded in the process of rendering the page illustrated in the second window 1306, the script having automatically filled in the various pieces of information in the user interface 1302 into the form element GUIs. Requesting the script from the network-based payment system, the remote machine 202 may in some embodiments have presented a global unique identifier (GUID), such as stored in a cookie on the remote machine 202, as provided by the network-based payment system 208 in response to successful verification of the credentials (entered in fields 1310 and 1313 in FIG. 13). In transmitting the credentials to the network-based payment system 208, an indication of the URL or other form identifying data from the main window containing user interface 1302 may have been transmitted.

Once the entity attribute values have been automatically entered into the user interface, the script may further provide for the automatic invocation of the "Place Order" button 1305.

Example Methods and Systems for Entity Attribute Value Learning

In portions of the specification above, operations, systems and user interfaces are presented in which electronic form automation may be carried out using the transmission of various form filling instructions from a network-based payment system to a remote machine in which a web browser or other form display and form data collection application may be executing. It will be appreciated that in order to carry out the generation of form filling instructions to fill in a sequence of one or more forms, it may in some embodiments be a precondition to the form filling instruction generation that entity attribute values appropriate to the entity on whose behalf the one or more electronic forms within the sequence are being filled as well as the mapping or relationship between the entity attribute values and the form elements for which form filling instructions are to be generated, be available to the network-based payment system 206 and in some embodiments to the instruction generation module 220 from a data store 218.

In some embodiments, however, while a network-based payment system 208 may have information describing the relationship between form elements within a sequence of one or more electronic forms and entity attribute identifiers for a particular entity, the network-based payment system might not have corresponding entity attribute values to those entity attribute identifiers for a particular entity for whom the network-based payment system 208 maintains personal or demographic information. Under these circumstances, it may be possible in some embodiments for the network-based payment system 208 to learn the values of various entity attribute values for a particular entity by receiving those values from a remote machine 202, the remote machine 202 having recorded those values as entered within one or more electronic forms by the entity or by a user entering them on behalf of the entity.

In overview, this process may be carried out by the provision of a button element within an electronic document served by the network-based commerce system 206 website or other form server. This electronic document may be rendered in a first browser window. Upon clicking this button element, a second window may be opened by the web browser application, in some embodiments running on the remote machine wherein the second window includes in its rendering the execution of a script to observe the entry of values into and/or navigation among one or more electronic forms illustrated within a first browser window. Once a checkout flow or other form entry process has been completed by a user, the user may indicate the process is completed whereupon the credentials of the entity on whose behalf the user was entering data into the form elements may be requested. These credentials along with the recorded values may be transmitted to a network-based payment system and if the credentials entered by the user match those associated with the entity on whose behalf the user is purportedly acting, the values may become associated with the entity.

It will be appreciated that the entry of the credentials may precede or follow the recording of the values by the user into the electronic form or forms provided by the network-based commerce system 206 or other form server. In some embodiments, when the credentials are to the entered at the beginning of the process, the network-based payment system 208 may, based on the credentials and the form identifying data that may identify a sequence of forms, determine whether sufficient data is stored in the network-based payment system for the entity for whom credentials were entered to carry out automated form filling as described in the preceding sections or whether the network-based payment system does not have sufficient information, in which case the user may be invited to enter the values into the forms as described below.

Figure 15:
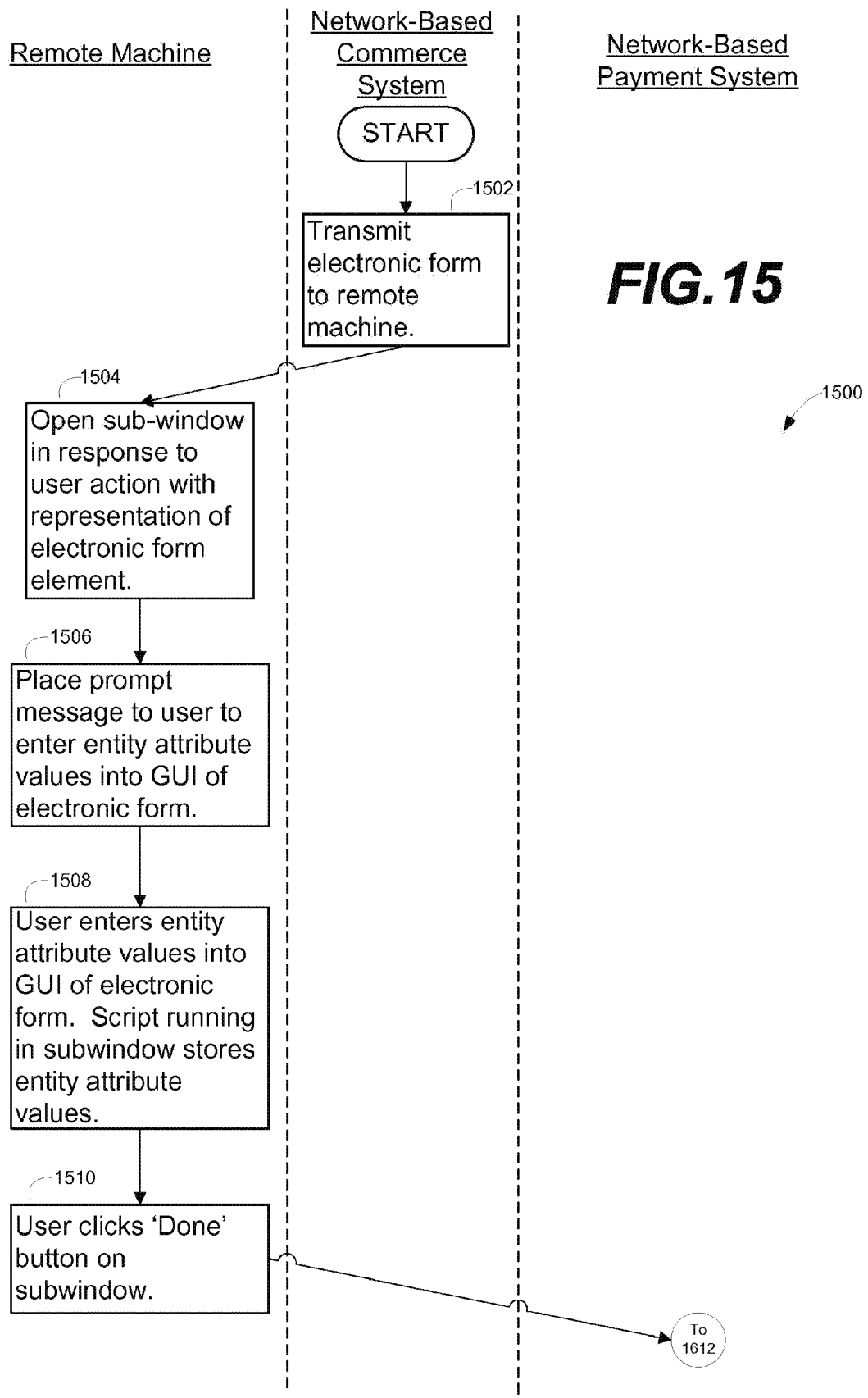
FIG. 15 and FIG. 16 illustrate a flowchart of a process for a network-based payment system to learn entity attribute values, according to an example embodiment.
Figure 16:
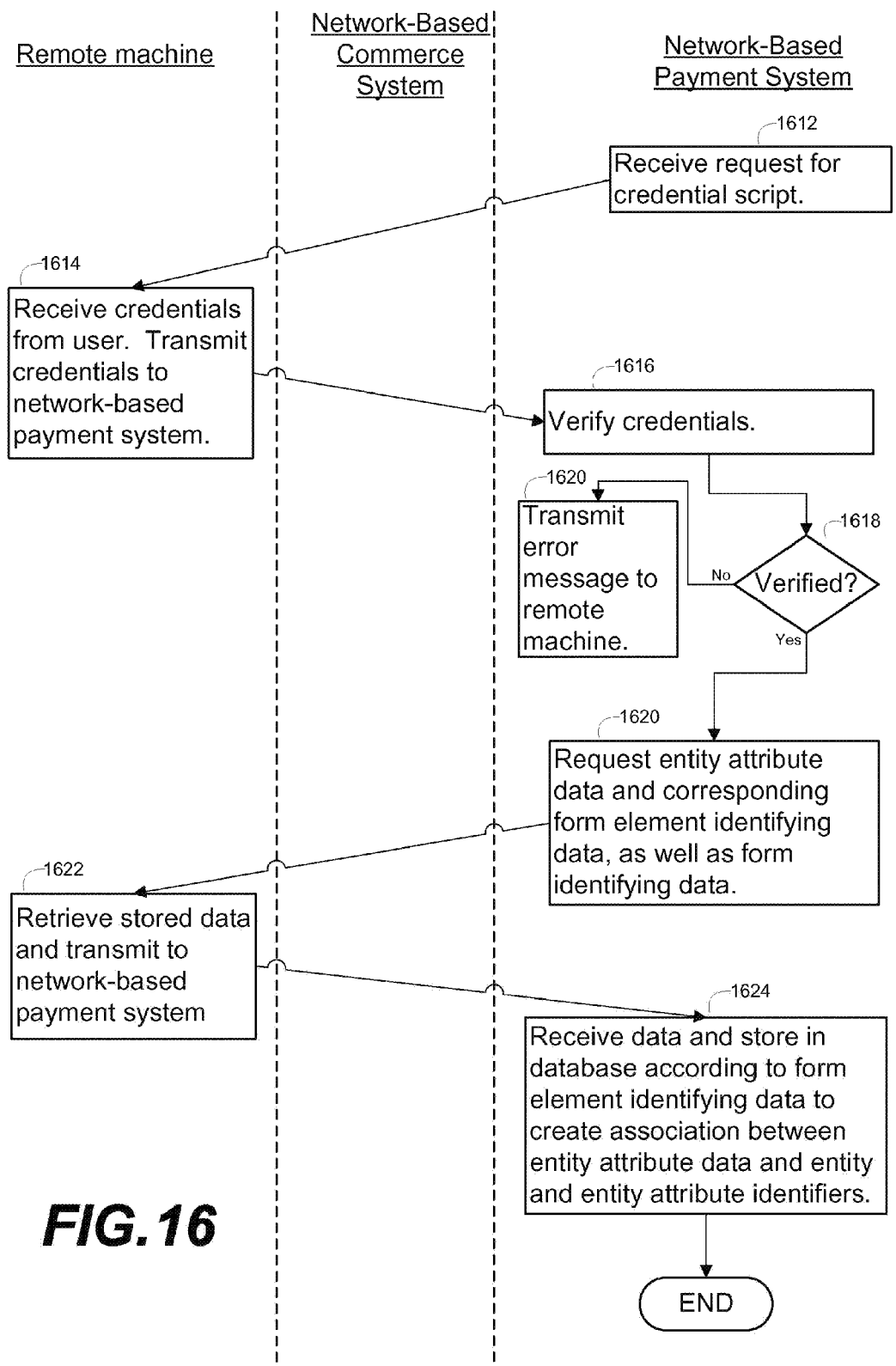

FIG. 15 and FIG. 16 illustrate a flowchart of a process 1500 for a network-based payment system to learn entity attribute values, according to an example embodiment.

In the flowchart illustrating process 1500, various entity attribute values are illustrated as being recorded via a script or other instructions running on a remote machine 202. These entity attribute values may be later transmitted to a network-based payment system 206 in conjunction with credentials associated with that entity that are received after the recording. It will be appreciated that in some other embodiments the credentials may be received at the remote machine and/or transmitted to the network-based payment system 206 prior to recording of values at the remote machine 202.

At block 1502, a network-based commerce system 206 or other form serving system, may transmit an electronic form to a remote machine. This electronic form may be a single electronic form or may be one electronic form out of a sequence of one or more electronic forms. At block 1504, a remote machine 202 may open a second (e.g. sub-window) in response to the user interacting with some GUI representation of an element in the electronic form. For example, in some embodiments, this sub-window may be opened in response to the clicking by a user on a button element in graphical representation of the electronic form or other electronic document. Such a button element may be similar to the one illustrated in Table 1 and may be represented by a GUI such as button 1804 of FIG. 18. At block 1506, the prompt message to the user to enter entity attribute values into the graphical user interface of the electronic form may be presented, such as in the sub-window. This prompt may be part of a script served from the network-based commerce system 206 and the script may also include machine-readable instructions for recording the entries of the values into the one or more electronic forms.

An example of pseudocode for such a script is illustrated in Table 4, to illustrate the recording of a value from the 'FN' form element.

TABLE 4 document.opener.for5.FN.onchange="window['AC'].document.
recorder.FN.value=this.value;'
document.write("<form name=recorder
action=http://xyz_pay.com method=post>");
document.write("<input type=hidden name=FN value=''>");
document.write("<input type=submit value='Click here to
submit your information to xyz_pay'>");
document.write("</form>");

At block 1508, the user of the remote machine may enter values into the graphical user interface of the electronic form or sequence of electronic forms. The script running in the sub-window may, in response to the user entry of the values, store these values in the remote machine 202. At block 1510 the user may click an e.g. "Done" or "Complete" button in the sub-window to indicate the completion of the value entry recording process. It will appreciated that when the electronic form or electronic form sequence is being shown in a web browser window as having been served by a particular web domain, the script running in the second browser window or sub-window may access and/or record user entries in the first window when the electronic document (including the script) is served from the same domain as the electronic form.

Processing may then continue at block 1612 of FIG. 16. At block 1612 the network-based payment system 208 may receive a request for a credential script. This request may be transmitted from the remote machine as actuated by the user clicking the "Done" button. This request may be carried out by arranging for the "Done" button to also redirect the sub-window to the URL served by the network-based payment system 206. At block 1614, the remote machine 202 may present a credential receiving form received from the network-based payment system 208 and thereby receive credentials from the user. These credentials received may for example be a login name or email address and password corresponding to the entity on whose behalf the user is recording attribute values as entered in the electronic form or forms. In response to the entry of the credentials (continuing at block 1614) the credentials may be transmitted to the network-based payment system 208. At block 1616 the network-based payment system 208 may verify the credentials to determine whether they correspond to an entity that the network-based payment system 208 recognizes and/or maintains information on the entity's behalf. At block 1618 the network-based payment system may verify the authenticity of the credentials. If the credentials are not verified, an error message may be transmitted to the remote machine 202 at 1620. In some embodiments, the sub-window need not include a done/submit button. For example, the sub-window may wait for the user to click submit on the final electronic document of the sequence and then automatically self-submit to the network-based payment system 208 (e.g. xyz_pay.com in the examples here.)

On the other hand, if the network-based payment system 208 verifies the credentials at 1618, then at block 1620 the network-based payment system 208 may request entity attribute data and the corresponding form element data as well as form identifying data from the remote machine 202. It will be appreciated that in the recording and storage of entity attribute values at 1508, the remote machine 202 may store the relationship between the values entered and the form elements into which the values were entered by the user as well as indications of the form identifying data to identify the first electronic form and any additional electronic forms in the sequence. It is this information the mapping between values entered by the user and the electronic forms to which that data pertained that may provide the raw data to associate the values entered with the entity on whose behalf the values were entered.

At block 1622, the stored data mentioned above may be retrieved by the remote machine 202 and transmitted to the network-based payment system and at block 1624 the network-based payment system may receive the data and store it in the database according to the form element identifying data to create an association between the entity attribute data and the entity attribute identifiers.

Figure 17:
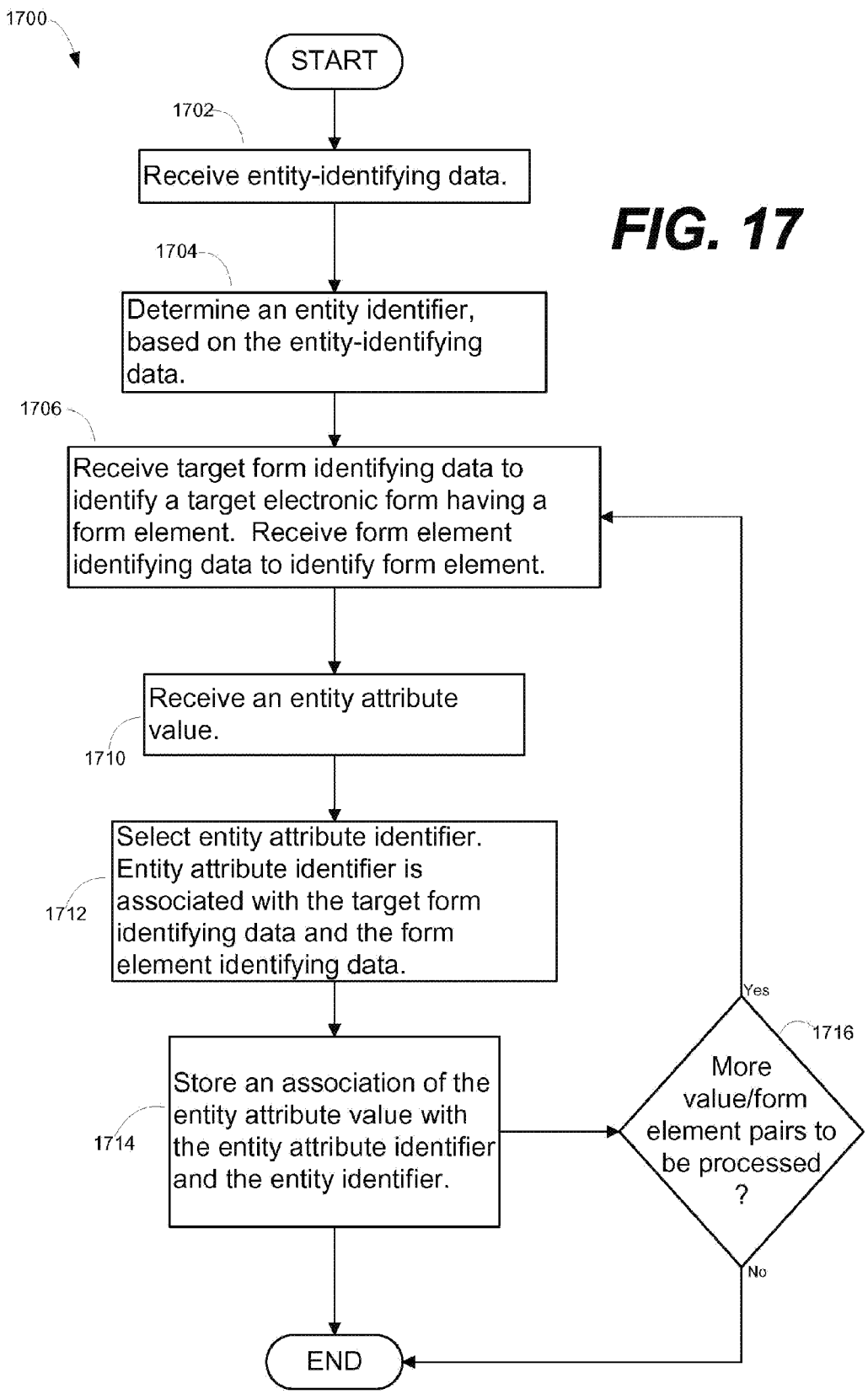
FIG. 17 is a flowchart of a process that may be used in associating entity attribute values with entity identifiers and entity attribute identifiers, according to an example embodiment.

FIG. 17 is a flowchart of a process 1700 that may be used in associating entity attribute values with entity identifiers and entity attribute identifiers, according to an example embodiment.

At block 1702, entity-identifying data may be received via a communication module 212. The entity-identifying data may include a user name, password, cookie, or other combination of data to identify an entity.

At block 1704, an entity identifier may be determined based on the entity-identifying data, for example given a password and an email address, an entity identifier may be retrieved from an entity's table, such as for example entities table 602 in FIG. 6. This may be carried out by an identification module 214 in some embodiments.

At block 1706, target form identifying data to identify target electronic form having a form element may be received. In addition, form element identifying data to identify the form element may be received. For example, a URL or other data to identify a target electronic form may be received as well as form element identifying data to identify a form element within the target form. The form element identifying data may include, for example, a string such as that indicated at 306 of FIG. 3. At block 1710, an entity attribute value may be received. It will be appreciated that in this point in the process, the entity to which this entity attribute value corresponds may not yet be determined as in some embodiments the processing of block 1704 may occur later than the processing of block 1712. The operations of blocks 1706 and 1710 may be carried out by the communication module 212.

At block 1712, an entity attribute identifier may be selected. This selection may be carried out by the learning module 221. This entity attribute identifier may be associated with the target form identifying data and the form element identifying data. For example, referring to form information table 606 of FIG. 6, if the form identifying data included the form identifier, some_merchant.com/checkout.html and the form element identifying data included the form element "ADR", the entity attribute identifier selected in block 1712 may be the entity attribute identifier "ADDRESS".

Finally, at block 1714, an association may be stored (e.g., by the learning module 221), such as, for example, association data that associates the entity attribute value with the entity attribute identifier and the entity identifier. For example, if the entity attribute identifier "ADDRESS" was selected at 1712, the entity identifier "E23653" is then determined at block 1704 and the value "123 Chicken Street" then received at block 1710, the processing at block 1714 may serve to store this association in an entity attribute table, for example entity attribute table 502 in row 504.

At block 1716, a determination may be made (e.g., via a learning module 221) as to whether more (value/form element) pairs are to be processed, such as for example, associations between values and form identifying data and form element identifying data. If not, the process 1700 may be complete. On the other hand, if more value and form element pairs are to be processed, processing may continue at block 1706. Such processing may continue for each of the electronic forms in the sequence for which user entries were received.

Figure 18:
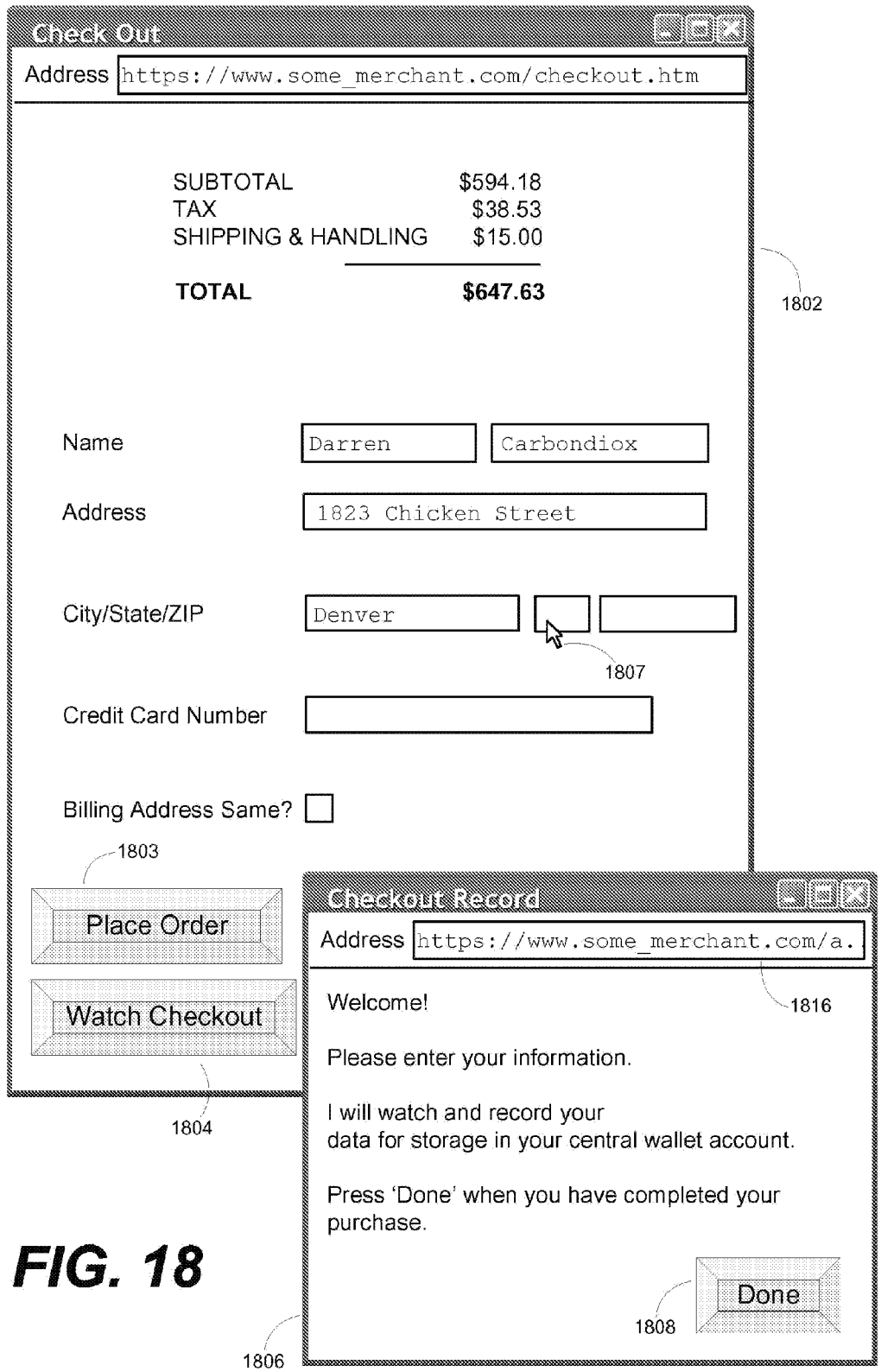

FIG. 18 and FIG. 19 illustrate graphical user interfaces that may be used in learning entity attribute values in the context of electronic form automation, according to an example embodiment.

FIG. 18 illustrates an example graphical user interface 1802, such as may be displayed by a web browser application on a remote machine 202 in response to a user requesting an electronic form, such as for example, the checkout.htm form represented in the user interface 1802.

Assume for the purposes of example that the particular customer has made a purchase from the "some_merchant. com" network-based commerce system. To simplify the example, assume that a sequence of electronic forms including only one form is used to checkout and complete the transaction. In filling out the electronic form represented by graphical user interface 1802, an entity such as customer Darren Carbondiox may enter various pieces of information and then complete the transaction by pressing a "Place Order" button 1803. On the other hand, suppose that the customer has not yet stored his or her name and address or credit card number with the network-based payment system 208, but wishes for the network-based payment system 208 to retain this information for future use, such as from checking out or making other transactions from other network-based commerce systems or other form serving systems in the future. To facilitate this, the form or other electronic document served by the network-based commerce system 206 and represented by graphical user interface 1802 may include a "Watch Checkout" (or the like) button element, represented by clickable button 1804. When clicked, this "Watch Checkout" button may open a second sub-window such as the record sub-window 1806. In order to record the form values entered into the user interface 1802, this sub-window 1806 may permit the requesting of an electronic document including or referencing a recording script. To facilitate the observation of value entry in the user interface 1802, this electronic document, within the browser security model, may be from the same domain as the domain that served the electronic form or other electronic document represented by user interface 1802. This domain name correspondence may be noted by reference to address textbox 1816, within the sub-window 1806.

In rendering the electronic document in the sub-window 1806, a welcome message to encourage the user to enter their information into the user interface 1802 may be presented. In some embodiments, the storage of various entity attribute values by a third party (e.g., a network-based payment system 208) in association with an entity may be termed an "electronic wallet" or "wallet account."

In response to this text, in the example illustrated in FIG. 18, a user is entering data in the electronic form displayed in the user interface 1802 on behalf of Darren Carbondiox and is just about to enter the state information as illustrated by the position of the cursor 1807. Once the user had entered this information and information on any other electronic forms involved in the checkout flow or other form sequence, a user may click the "Done" button 1808 in the sub-window 1806. In some embodiments, the sub-window 1806 may include a text such as "Click to submit your information to xyz_pay.", referring to the example network-based payment system 208 illustrated in the tables and figures.

Once the customer has clicked on the "Done" button 1808, the various values and other information recorded by the script may be stored within the remote machine 202, such as for example by being stored as cookies or other storage artifacts. Once the user has clicked the "Done" button 1808, the sub-window 1806 may be redirected to the network-based payment system 208 to receive a form permitting the entry of credentials for the entity for whom the values were being recorded as indicated by the network-based payment system 208 served page credent.htm URL, illustrated in the address field 1920. The sub-window 1806 may transmit the entity attribute values to the network-based payment system 208 for storage. The network-based payment system 208 may solicit authentication or credentials to correctly and securely associate the entity attribute values with the right entity.

In response to receiving the credential requesting form from the network-based payment system 206 and rendering it in the sub-window 1806, the user may enter the credentials, such as for example an email address, username, user ID, password, etc. for example, into the text fields 1922 and 1924. Once this is done, the user may click the "Continue" button 1926, such as by positioning cursor 1928 over this button and pressing an input device button.

It will be appreciated that, in addition to using a web interface, it is also possible in some embodiments to provide interfaces through a mobile terminal, a cell phone, internet telephony or other media.

Systems and Processes for Learning Associations Between Entity Attribute Identifiers and Form Element Identifiers or Form Element Identifying Data In the sections above in which FIG. 13 through FIG. 19 are described, it may be that a network-based payment system has information about a sequence of electronic documents, such as a sequence of electronic forms, as well as form information, such as for example illustrated in form information table 606, which may be used to map from form elements identifying data to entity attribute identifiers. In this way, a network-based payment system 208 may receive entity attribute values, and by cross-referencing an entity identifier with the values entered in the various form elements with the form element identifying data to entity attribute identifiers, the network-based payment system 208 may learn entity attribute identifier to entity attribute value associations for a particular entity.

In some embodiments, a network-based payment system 208 may not yet have information about a particular sequence of one or more electronic documents, such as electronic forms, or have mappings from electronic forms and form element identifying data to entity attribute identifiers, of the type illustrated in the example form information table 606.

In order to learn the structure of a sequence of one or more electronic forms, a network-based payment system 208 may store information about an entity including all of the entity attribute values to be entered into the sequence of forms. For example, suppose that a network-based commerce system 206 includes a product checkout flow including three electronic forms. Suppose further, that a particular entity, such as for example a system administrator of the network-based commerce system 206, has all of the entity attribute identifier/value pairs stored by the network-based payment system 208 that may be necessary to carry out a sample checkout flow.

Then if the network-based payment system receives (in an authenticated message from e.g. a remote machine 202 authenticated by credentials of the network-based commerce system 206 and its administrator) mappings between form element identifying data and values stored by the network-based payment system 208 for that administrator, the network-based payment system 208 may be able to infer the mappings from form element identifying data, such as form element identifiers and entity attribute identifiers such as illustrated in the form information table 606. In addition, the network-based payment system 208 may be provided with other data that may be used to learn the sequence, such as for example a sequence of button element activations that may be used to generate script or other set of instructions or automated filling and submission of the various electronic forms included in the sequence.

As in the process for the network-based payment system to learn entity attribute values illustrated in FIG. 15 and FIG. 16, the process to learn form information about a sequence of one or more electronic forms, based on the entry of values corresponding to a particular entity, may be carried out by having a user first enter credentials for the entity, such as the system administrator of a network-based commerce system into an electronic form served by the network-based payment system 208 and then be redirected to a URL of an electronic document served by the network-based commerce system along with the provision of a GUID, such as by cookie, whereupon the user may be prompted to enter values to carry out a sample form entry flow within a sequence of forms served by the network-based commerce system 206 or other form server. In some other embodiments, a form entry value recording script may be served by the network-based commerce system 206. The script may provide instructions to store the pairings of form values and form element identifying data on the remote machine 202, such as in the form of cookies, that may be retrievable by a web page script served later from the network-based payment system 208 in conjunction with the entry of entity's credentials.

Table 5, below, illustrates pseudocode that indicates how pairings of form element identifying data and form values may be stored. The pseudocode of Table 5 includes a clickable button element that a user on a remote machine 202 may click or otherwise actuate after submitting a form served from a network-based commerce system 206. Once a user has clicked the button in the sub-window (e.g. sub-window 2108), the remote machine 202 may transmit the form element identifying data/form value pairs to the network-based payment system 208, where the for values may then be normalized and mapped.

TABLE 5

```
// simplified version of a field/value learning tool
// This code is part of the javascript include
// attach onsubmit to each form on the page
for (i=0; i<opener.document.forms.length; i++)
    opener.document.forms[i].onsubmit="window['AC'].grab
FormEntries(this);"
function grabFormEntries(frm) {
    for (i=0; i<this.elements.length; i++) {
        document.recorder.field_nms.value=document.recorder
        .field_nms.value+','this.elements[i].name
        document.recorder.vals.value=document.recorder.vals
    .value+','+this.elements[i].value
    }
    document.write("<form name=recorder
action=http://xyz_pay.com method=post>");
    document.write("<input type=hidden name=field_nms
value=''>");
    document.write("<input type=hidden name=vals
value=''>");
    document.write("<input type=submit value='Click here to
submit your
information to xyz_pay'>");
    document.write("</form>");
```

At the network-based payment system 208, the server-side pseudocode illustrated in Table 6 may be run, such as for example by the learning module 221.

TABLE 6

```
for each entityAttribute
    for i=1 to listLength(vals)
        // loop through all values to see if any value
        entered by the user equates to a known attribute
        mapping
        if vals(i) = entityAttribute.value then
            formElement = field_nms(i)
    loop
loop
```

Figures 20, 21:
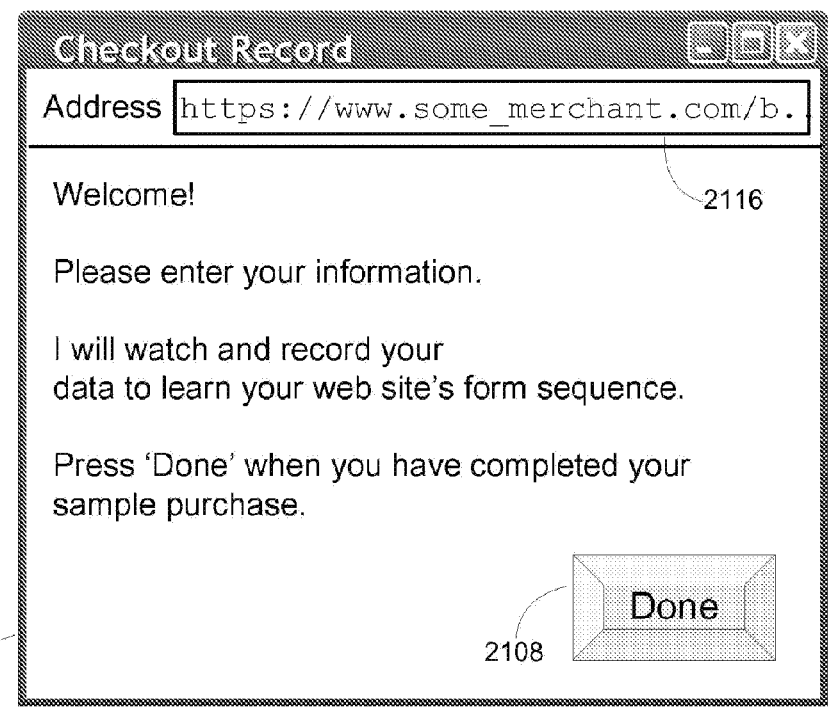
FIG. 20 illustrates an operation block that may be substituted for another block within FIG. 16 to carry out electronic form sequence learning, according to an example embodiment.
FIG. 21 illustrates a graphical user interface window that may be used within a process for carrying out electronic form sequence learning, according to an example embodiment.

In this second embodiment, the process for receiving and processing entity data may be similar to that illustrated in FIG. 15 and FIG. 16 but may differ insofar as block 1624 may be replaced with block 2020 of FIG. 20, in an example embodiment. In block 2020, data including form element identifying data and values, as well as data describing the recorded form sequence flow, such as for example sequences of button element actuations, may be received. The entity attribute values may be correlated with the values received as paired with the form element identifying data to create associations between the form element identifying data and entity attribute identifiers.

Sequence related information, such as for example the button elements actuated to proceed from one electronic form to the next within the sequence as clicked by the user during the recording phase, may be used in constructing a sequence table 802 of FIG. 8. In addition, in some embodiments, the network-based commerce system administrator table 422 may be used to indicate which entity identifier, such as for example in column 424, are eligible to have their attribute value data used in learning form information and form sequence flows within form information table 412 by the use of the network-based commerce system identifier column 426 serving as a key to the network-based commerce system identifier column 414 in some embodiments.

FIG. 21 illustrates an example of a user interface sub-window 2106 that may be used in recording a user's interactions with a sequence of electronic forms for learning a mapping between form element identifying data and entity attribute identifiers, according to an example embodiment.

In the user interface window 2106 (which may be a sub-window running on a remote machine 202), a user may retrieve a script-referencing electronic document from a network-based commerce system 206 or other form provider having the URL illustrated in the address box 2116. This electronic document may include a "Done" button 2108 as well as a message to the user to indicate that the user is to enter various piece of information associated with an entity into a sequence of one or more electronic forms in the main or first window, such as for example first window housing user interface 1802. The sub-window 2106 may thus be considered analogous to the sub-window 1806 of FIG. 18.

This script-referencing electronic document may include or reference a script capable of recording the various pairings between user-entered values and form element identifying data and in some embodiments the sequence of button element actuations used to traverse or navigate the form element sequence or the electronic document sequence that includes one or more electronic forms.

Figure 22:
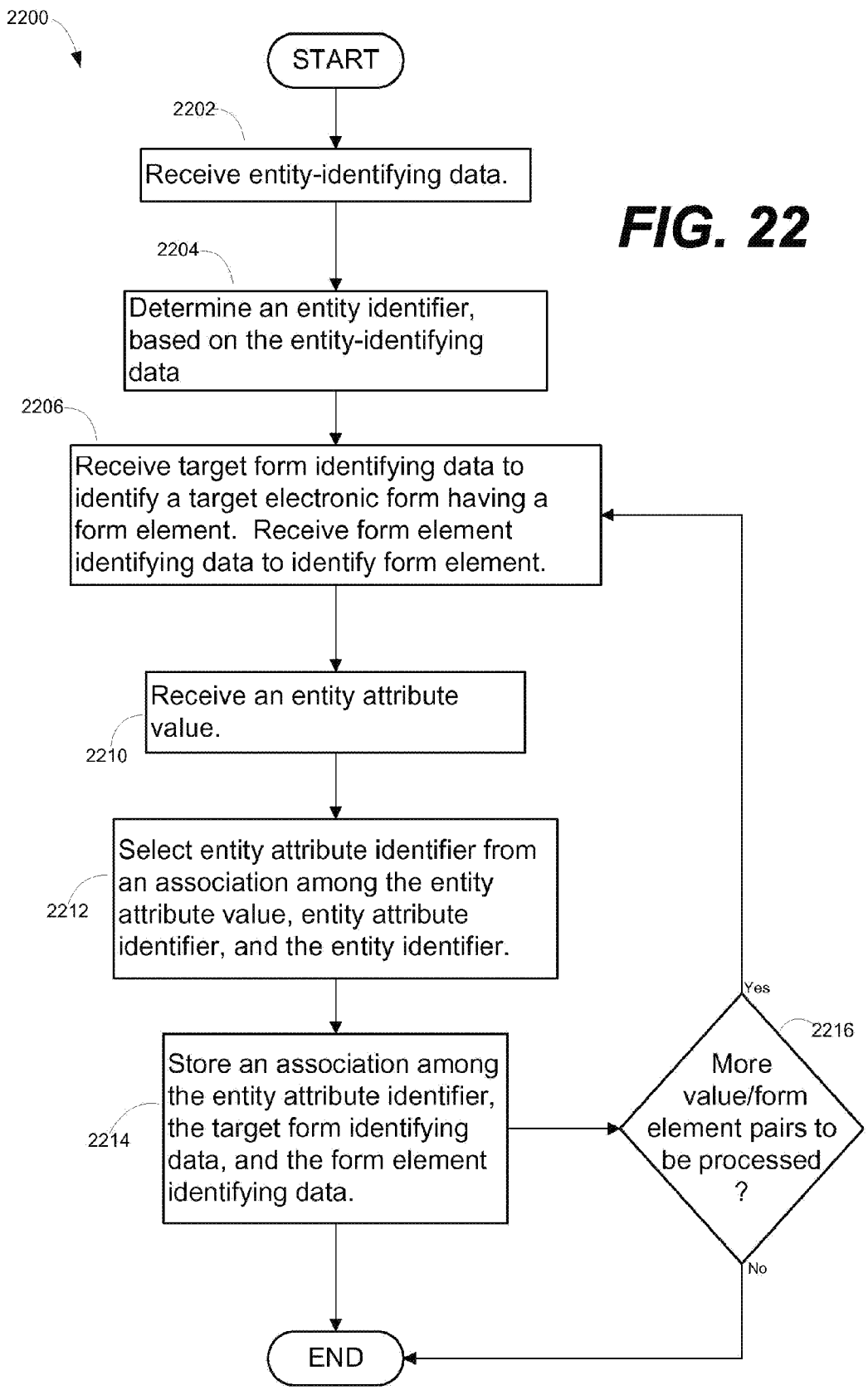
FIG. 22 is a flowchart of a process for processing entity attribute values paired with form element identifying data, such as may be used by a network-based payment system in learning the sequence of electronic forms using entity attribute values, according to an example embodiment.

FIG. 22 is a flowchart of a process 2200 for processing entity attribute values paired with form element identifying data, such as may be used by a network-based payment system in learning the sequence of electronic forms using entity attribute values, according to an example embodiment.

At block 2202 a network-based payment system 208, or other system maintaining data store 218, including for example data structures such as illustrated in FIG. 4, may receive entity-identifying data, such as for example the username and password of an entity that may serve to identify an entity for which entity attribute values and their associated entity attribute identifiers are to be used in the learning process. At block 2204, an entity identifier may be determined, based on the entity-identifying data. The processing in block 2202 and 2204 may be carried out by a communication module 212 and identification module 214, respectively. At block 2206, target form identifying data may be received to identify a target electronic form, such as for example one electronic form within a sequence of one or more electronic forms, in which the target electronic form has a form element. This form element may in some embodiments include a text entry box, a checkbox descriptor, a text entry box descriptor or radio button descriptor, a drop down menu descriptor, a selectable list descriptor or a text entry field descriptor. Form element identifying data to identify the form element may also be received at block 2208.

At block 2210 an entity attribute value may be received. This entity attribute value may be transmitted by a remote machine 202 in association with the form element identifying data which may serve to identify the form element into which a user entered the entity attribute value. At block 2212 an entity attribute identifier may be selected by a learning module 221 from an association among the entity attribute value, the entity attribute identifier and the entity identifier. For example, referring to FIG. 5, suppose that the entity identifier determined at block 2204 is determined to be the identity identifier "E23653" and the entity attribute value received at block 2210 is the string "123 Chicken Street". In this example, the attribute identifier selected at block 2212 may be the "ADDRESS" entity attribute identifier from the association indicated at 504. At block 2214 an association among the entity attribute identifier, the target form identifying data and the form element identifying data may be stored, such as for example by the learning module 221. Continuing the example, suppose that the target form identifying data is a form identifier "www.some_merchant.com/checkout.htm" and the entity attribute identifier selected at block 2212 is the "ADDRESS" string and the form element identifying data is the string "ADR". In response, the network-based payment system 208 may store an association, such as for example the association 616 into the data structure such as form information table 606 and thus associate an entity attribute identifier with a form identifier and a form element identifier.

At decision box 2216, a decision may be made (e.g. via the learning module 221) as to whether more value to form element pairs need to be processed. In some embodiments, all form element or form element identifying data to value pairs within a particular electronic form may be processed before processing those pairs entered into another form such as within a sequence of electronic forms. If there are more pairs to be processed, the processing may continue at block 2206 with the receiving form element identifying data and target form identifying data as necessary and processing the value that may be provided in association with the form element identifying data. On the other hand, if no more pairs need to be processed, as determined at decision box 2216, the process may be considered complete.

It will be appreciated that although the process 2200 shows the receiving of entity-identifying data and the determining of the entity identifier may occur at the beginning of the process, in some embodiments, this entity-identifying data may be received and/or the entity identifier determined later in the process 2200, such that the entity identifier may be available for the processing at block 2212 in view of the value received at block 2210.

It will be appreciated that there are number of different technologies and techniques by which various processes described in this specification may be carried out. For example, while the above has been described in terms of various scripts delivered from a network-based payment system 208, the recording of data and providing of form filling instructions may be executed within a window or sub-window provided by a web browser running on a remote machine. In some embodiments, these processes may be carried out by a toolbar that a user may download and incorporate into the functionality of a web browser or other application. In some embodiments, a user may download some other type of client-side application within which functionality described in this specification is included. Such a client-side application may include a toolbar, a web plug-in, a standalone desktop application, or the like.

Such an e.g. toolbar may be capable of receiving credentials transmitting the credentials received to a network-based payment system, recording user interaction with a form or other electronic document or documents within a web browser window, and receiving and executing form filling instructions and/or form filling instruction scripts.

Although the procedures described in the above sections of the specification were mentioned in terms of an application to checkout automation within an electronic commerce context, it will be appreciated that these same form automation processes, including processes for the use of form filling instructions and processes to automatically record and process values entered into electronic forms, such as to allow any network-based payment system or other central data repository or data maintenance system to store entity attribute data and/or learn the structure of sequences of electronic form, may be applied to a wide range of endeavors.

Example Computer Systems for Carrying Out Operations

Figure 23:
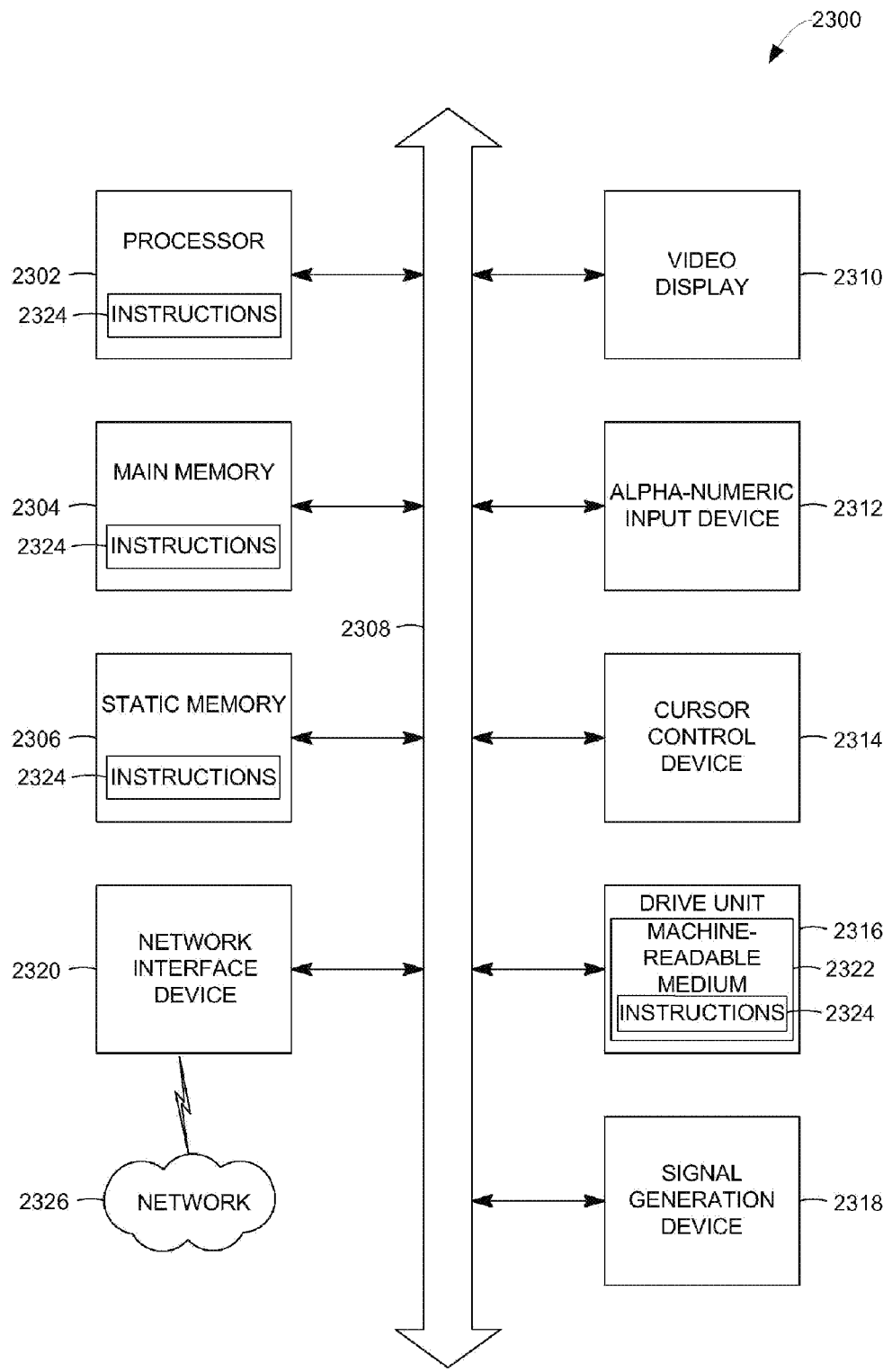
FIG. 23 shows a diagrammatic representation of machine in the example form of a computer system within which a set

FIG. 23 shows a diagrammatic representation of machine in the example form of a computer system 2300 within which a set of instructions, for causing the machine to perform any one or more of the methodologies, processes, or operations discussed herein, may be executed. In some embodiments, a computer system 2300 may be used to interact with a network-based commerce system 206 and/or network-based payment system 208. One or more computer systems 2300 may, in some embodiments, be used to implement a network-based commerce system 206 and/or network-based payment system 208.

In alternative embodiments, the machine operates as a standalone device or may be connected (e.g., networked) to other machines. In a networked deployment, the machine may operate in the capacity of a server or a remote machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2300 includes a processor 2302 (e.g., a central processing unit (CPU) a graphics processing unit (GPU) or both), a main memory 2304 and a static memory 2306, which communicate with each other via a bus 2308. The computer system 2300 may further include a video display unit 2310 (e.g., a liquid crystal display (LCD) or a cathode ray tube (CRT)). The computer system 2300 also includes an alphanumeric input device 2312 (e.g., a keyboard), a cursor control device 2314 (e.g., a mouse), a disk drive unit 2316, a signal generation device 2318 (e.g., a speaker) and a network interface device 2320.

The disk drive unit 2316 includes a machine-readable medium 2322 on which is stored one or more sets of instructions (e.g., software 2324) embodying any one or more of the methodologies or functions described herein. The software 2324 may also reside, completely or at least partially, within the main memory 2304 and/or within the processor 2302 during execution thereof by the computer system 2300, the main memory 2304 and the processor 2302 also constituting machine-readable media.

The software 2324 may further be transmitted or received over a network 2326 via the network interface device 2320.

While the machine-readable medium 2322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for electronic form automation has been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a communication module configured to:
      receive, from a remote machine, entity-identifying data; and
      receive target form identifying data, the target form identifying data identifying a target electronic form having a form element;
   an identification module configured to determine an entity identifier based on the received entity-identifying data;
   an instruction generation module configured to:
      select form element identifying data that characterizes the form element;
      map an entity attribute identifier to the form element identifying data; and
   a data access module configured to access, from a data store in a network-based payment system, an entity attribute value based on the entity identifier and the entity attribute identifier; and
   the communication module further configured to transmit, to the remote machine, form-filling instructions operable to cause a machine to automatically populate the form element with the entity attribute value.

2. The system of claim 1, wherein:
   the communication module is further configured to receive:
      the entity attribute value associated with the form element identifying data; and the system of claim 1 further comprising a learning module configured to:
      select the entity attribute identifier based on the form element identifying data, the entity attribute identifier being associated in the data store with the form element identifying data; and
      store, in the data store, an association of the entity attribute value with the entity attribute identifier of the entity identifier.

3. The system of claim 2, wherein the learning module is further configured to:
- select the entity attribute identifier from the data store, the data store storing an association among the entity attribute value, the entity attribute identifier, and the entity identifier and
- store, in the data store, an association among the entity attribute identifier, the target form identifying data, and the form element identifying data.

4. The system of claim 1, wherein the target form identifying data further identifies a sequence of two or more electronic forms.

5. The system of claim 1, wherein the entity identifier is a global unique identifier, and wherein the received entity-identifying data includes a password associated with the entity.

6. A method comprising:
- receiving, from a remote machine, entity-identifying data;
- receiving target form identifying data, the target form identifying data identifying a target electronic form having a form element;
- selecting form element identifying data that characterizes the form element within the target electronic form;
- determining an entity identifier based on the entity-identifying data;
- selecting form element identifying data that characterizes the form element;
- mapping an entity attribute identifier to the form element identifying data;
- accessing, from a data store in a network-based payment system, an entity attribute value based on the entity identifier and the entity attribute identifier; and
- transmitting, to the remote machine, form-filling instructions operable to cause a machine to automatically populate the form element with the entity attribute value.

7. The method of claim 6, further including generating the form-filling instructions.

8. The method of claim 6, wherein the target electronic form is a markup language document.

9. The method of claim 8, wherein the target electronic form and a second markup language document are served by a first web domain, the second electronic document referencing a script, the script including the form-filling instructions and served by a second web domain in response to a request during a rendering of the second markup language document.

10. The method of claim 9, wherein the rendering of the second markup language document and the requesting of the script are carried out by the remote machine.

11. The method of claim 6, wherein the form element includes at least one of a group including a text entry box descriptor, a check box descriptor, a radio button descriptor, a drop-down menu descriptor, a selectable list descriptor, and a text entry field descriptor.

12. The method of claim 6, further comprising:
- receiving, from the remote machine, credentials of an entity;
- determining whether the credentials are valid; and
- selectively transmitting the entity-identifying data to the remote machine when the credentials are valid.

13. The method of claim 12, wherein the credentials include a password associated with the entity.

14. The method of claim 12, wherein the receiving of credentials is via a transmission in response to a user interaction with a web browser toolbar running on the remote machine.

15. The method of claim 12, wherein the receiving of credentials is via a transmission in response to a user interaction with a first web browser window running on the remote machine.

16. The method of claim 15, wherein the first web browser window is presented in response to a user interaction with a graphical user interface (GUI) in a second web browser window, the GUI corresponding to an electronic document.

17. The method of claim 16, wherein the electronic document is served by a network-based commerce system and the electronic document is the target electronic form.

18. The method of claim 12, wherein the receiving of the form element identifying data is via a transmission from a web browser toolbar.

19. The method of claim 6, wherein the transmission of the form-filling instructions to the remote machine is in response to a request from the remote machine for the form-filling instructions.

20. The method of claim 19, wherein the request from the remote machine includes the entity-identifying data.

21. The method of claim 19, wherein the request from the remote machine includes the target form identifying data.

22. A method comprising:
- receiving, from a remote machine, entity-identifying data;
- determining an entity identifier based on the entity-identifying data;
- receiving, from the remote machine, target form identifying data to identify a target electronic form having a form element;
- receiving, from the remote machine, form element identifying data that characterizes the form element;
- receiving an entity attribute value from the remote machine;
- mapping an entity attribute identifier to the form element identifying data; and
- storing, in a data store of a network-based payment system, an assignment of the entity attribute value with the entity attribute identifier of the entity identifier.

23. The method of claim 22, wherein the entity attribute value is associated with the form element identifying data by user entry of the entity attribute value into a graphical user interface (GUI) element corresponding to the form element.

24. The method of claim 22, wherein the target electronic form is a markup language document.

25. The method of claim 22, wherein the entity-identifying data includes valid credentials associated with the entity.

26. The method of claim 25, wherein the credentials include a password associated with the entity.

27. The method of claim 25, wherein a remote machine prompts for the credentials from a user via a web browser toolbar.

28. The method of claim 25, wherein a remote machine prompts for the credentials from a user via a first web browser window.

29. The method of claim 28, wherein the first web browser window is presented in response to a user interaction with a rendering, in a second web browser window, of an electronic document.

30. The method of claim 29, wherein the electronic document is served by a network-based commerce system.

31. The method of claim 22, wherein the entity attribute value, the form element identifying data, and the target form identifying data are received from the remote machine, the remote machine having carried out a method comprising:
- presenting a graphical user interface (GUI) element corresponding to the form element;
- receiving user input via the GUI element; and
- in response to receiving the user input, identifying the user input as the entity attribute value and associating the entity attribute value with the form element identifying data and the target form identifying data.

32. A method comprising:
receiving, from a remote machine, entity-identifying data;
determining an entity identifier based on the entity-identifying data;
receiving, from the remote machine, target form identifying data to identify a target electronic form having a form element;
receiving, from the remote machine, form element identifying data that characterizes the form element;
receiving an entity attribute value from the remote machine;
selecting an entity attribute identifier from a data store in a network-based payment system, the data store storing an assignment of the entity attribute value to the entity attribute identifier and the entity identifier; and
storing, in the data store, a mapping of the entity attribute identifier to the target form identifying data and the form element identifying data.

33. The method of claim 32, wherein the entity attribute value is associated with the form element identifying data by user entry of the entity attribute value into a graphical user interface (GUI) corresponding to the form element.

34. The method of claim 32, wherein the entity-identifying data includes valid credentials of the entity.

35. The method of claim 34, wherein a remote machine prompts for the credentials from a user via a web browser toolbar.

36. The method of claim 34, wherein a remote machine prompts for the credentials from a user via a first web browser window.

37. The method of claim 36, wherein the first web browser window is presented in response to a user interaction with a rendering, in a second web browser window, of an electronic document.

38. The method of claim 32, wherein the entity attribute value, the form element identifying data, and the target form identifying data are received from the remote machine, the remote machine having carried out a method comprising:
presenting a GUI element corresponding to the form element;
receiving user input via the GUI element; and
in response to receiving the user input, identifying the user input as the entity attribute value and associating the entity attribute value with the form element identifying data and the target form identifying data.

39. A system comprising:
means for receiving, from a remote machine, entity-identifying data;
means for determining an entity identifier based on the entity-identifying data;
means for receiving, from the remote machine, target form identifying data to identify a target electronic form having a form element;
means for receiving, from the remote machine, form element identifying data that characterizes the form element;
means for receiving an entity attribute value from the remote machine;
means for selecting an entity attribute identifier from a data store in a network-based payment system, the data store storing an assignment of the entity attribute value to the entity attribute identifier and the entity identifier; and
means for storing, in the data store, a mapping of the entity attribute identifier to the target form identifying data and the form element identifying data.

40. A system comprising:
means for receiving, from a remote machine, entity-identifying data;
means for determining an entity identifier based on the entity-identifying data;
means for receiving, from the remote machine, target form identifying data to identify a target electronic form having a form element;
means for receiving, from the remote machine, form element identifying data that characterizes the form element;
means for receiving an entity attribute value from the remote machine;
means for mapping an entity attribute identifier to the form element identifying data; and
means for storing, in a data store of a network-based payment system, an assignment of the entity attribute value to the entity attribute identifier and the entity identifier.

41. A system comprising:
means for receiving, from a remote machine, entity-identifying data;
means for receiving target form identifying data, the target form identifying data identifying a target electronic form having a form element;
means for selecting form element identifying data that characterizes the form element within the target electronic form;
means for determining an entity identifier based on the entity-identifying data;
means for selecting form element identifying data that characterizes the form element;
means for mapping an entity attribute identifier to the form element identifying data;
means for accessing, from a data store in a network-based payment system, an entity attribute value based on the entity identifier and the entity attribute identifier; and
means for transmitting, to the remote machine, form-filling instructions operable to cause a machine to automatically populate the form element with the entity attribute value.

42. A non-transitory machine-readable medium comprising a plurality of instruction sets, the plurality of instruction sets comprising:
a first instruction set to cause a machine to receive, from a remote machine, entity-identifying data and target form identifying data, the target form identifying data to identify a sequence of two or more electronic forms, the sequence including a target electronic form having a form element;
a second instruction set to cause the machine to select form element identifying data corresponding to the form element within the target electronic form;
a third instruction set to cause the machine to determine an entity identifier based on the entity-identifying data;
a fourth instruction set to cause the machine to select an entity attribute identifier from a data store in a network-based payment system, the entity attribute identifier being mapped to the target form identifying data and the form element identifying data;
a fifth instruction set to cause the machine to select the entity attribute value from the data store, the entity attribute value being assigned to the entity attribute identifier and the entity identifier; and
a sixth instruction set to cause the machine to transmit, to the remote machine, form-filling instructions operable to cause a machine to automatically populate the form element with an entity attribute value.

* * * * *